(12) United States Patent
Shakir et al.

(10) Patent No.: US 10,785,278 B2
(45) Date of Patent: Sep. 22, 2020

(54) NETWORK MANAGEMENT INTERFACE

(71) Applicant: Google Inc., Mountain View, CA (US)

(72) Inventors: Robert Shakir, San Francisco, CA (US); Paul Borman, Inver Grover Heights, MN (US); Carl Lebsack, Felton, CA (US); Marcus Hines, Mountain View, CA (US); Anees Shaikh, San Jose, CA (US); Joshua George, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 517 days.

(21) Appl. No.: 15/343,876

(22) Filed: Nov. 4, 2016

(65) Prior Publication Data

US 2018/0131745 A1 May 10, 2018

(51) Int. Cl.
*H04L 29/06* (2006.01)
*H04W 8/22* (2009.01)
(Continued)

(52) U.S. Cl.
CPC ........ *H04L 65/608* (2013.01); *H04L 41/0853* (2013.01); *H04L 43/0817* (2013.01);
(Continued)

(58) Field of Classification Search
CPC ............... H04L 65/608; H04L 43/0817; H04L 41/0853; H04L 43/18; H04L 41/046;
(Continued)

(56) References Cited

U.S. PATENT DOCUMENTS 7,529,825 B1 * 5/2009 Freskos ............... H04L 41/0226
707/999.202
8,248,958 B1 * 8/2012 Tulasi ..................... H04L 43/50
370/241
(Continued)

FOREIGN PATENT DOCUMENTS

| CN | 102891768 A | 1/2013 | |
|---|---|---|---|
| EP | 2207306 A1 * | 7/2010 | ......... H04L 41/0853 |
| WO | WO-2009045959 A1 * | 4/2009 | ............ H04L 69/22 |

OTHER PUBLICATIONS

International Search Report and Written Opinion for Application No. PCT/US2017/052451 dated Dec. 4, 2017.

*Primary Examiner* — Gil H. Lee
*Assistant Examiner* — Javier O Guzman
(74) *Attorney, Agent, or Firm* — Honigman LLP; Brett A. Krueger

(57) ABSTRACT

A method for communicating over a specified protocol enabling bi-directional streaming between a network manager and a network device is provided. The method includes receiving, at data processing hardware of a network device, a request from the network manager requesting data including at least one of state information or configuration information. The request includes a get request to obtain a snapshot of the requested data existing on the network device or a subscribe request to subscribe to updates for the requested data existing on the network device. The method also includes transmitting a data response from the data processing hardware to the network manager via telemetry. The data response includes the requested data having data elements defined by at least one data schema supported by the network device. The capability and data requests and the capability and data responses adhere to a protocol configured to enable bi-directional streaming between the network manager and the network device.

24 Claims, 11 Drawing Sheets

(51) Int. Cl.
   *H04L 12/24* (2006.01)
   *H04L 12/26* (2006.01)
   *H04W 8/00* (2009.01)

(52) U.S. Cl.
   CPC .............. *H04L 43/10* (2013.01); *H04L 43/18* (2013.01); *H04W 8/22* (2013.01); *H04L 41/0213* (2013.01); *H04L 41/046* (2013.01); *H04W 8/00* (2013.01)

(58) Field of Classification Search
   CPC ...... H04L 41/0213; H04L 43/10; H04W 8/22; H04W 8/00
   See application file for complete search history.

(56) References Cited

U.S. PATENT DOCUMENTS

| | | | |
|---|---|---|---|
| 8,335,171 B1 | 12/2012 | Purkayastha et al. | |
| 8,713,133 B2 | 4/2014 | Sheppard | |
| 8,953,494 B2 | 2/2015 | Purkayastha et al. | |
| 9,094,299 B1 | 7/2015 | Rao et al. | |
| 9,258,132 B2 | 2/2016 | Vieira | |
| 2002/0034962 A1* | 3/2002 | Yokoyama | H04W 4/08 455/519 |
| 2002/0069199 A1* | 6/2002 | Kang | H04L 41/0677 |
| 2002/0174207 A1* | 11/2002 | Battou | G06F 8/65 709/223 |
| 2003/0061333 A1 | 3/2003 | Dean et al. | |
| 2003/0140132 A1* | 7/2003 | Champagne | H04L 41/0856 709/223 |
| 2004/0117452 A1* | 6/2004 | Lee | H04L 41/02 709/208 |
| 2004/0223602 A1* | 11/2004 | Honkasalo | H04L 41/0893 379/243 |
| 2006/0092861 A1* | 5/2006 | Corday | H04L 41/0213 370/256 |
| 2006/0112416 A1* | 5/2006 | Ohta | H04L 63/102 726/1 |
| 2006/0168263 A1* | 7/2006 | Blackmore | H04L 41/0213 709/230 |
| 2008/0251032 A1* | 10/2008 | Rector | A01K 1/0353 119/650 |
| 2009/0063650 A1* | 3/2009 | Anslow | H04L 41/082 709/208 |
| 2009/0070458 A1* | 3/2009 | Fuse | H04L 12/56 709/224 |
| 2011/0145660 A1* | 6/2011 | Pirozzi | G06F 11/0709 714/49 |
| 2012/0014246 A1* | 1/2012 | Matsumoto | H04L 41/0803 370/221 |
| 2012/0047204 A1* | 2/2012 | Lee | H04L 41/082 709/203 |
| 2014/0280855 A1* | 9/2014 | Yuengling | H04L 41/0213 709/223 |
| 2015/0043384 A1* | 2/2015 | Hui | H04L 41/12 370/255 |
| 2015/0074259 A1* | 3/2015 | Ansari | H04L 67/02 709/224 |
| 2015/0334548 A1* | 11/2015 | Liu | H04W 4/80 370/329 |
| 2017/0257214 A1* | 9/2017 | Stufflebeam | H04L 9/088 |
| 2017/0310695 A1* | 10/2017 | Vasseur | H04L 43/12 |

* cited by examiner

NETWORK MANAGEMENT INTERFACE

TECHNICAL FIELD

This disclosure relates to network management interfaces.

BACKGROUND

Network management interfaces allow network management systems to interact with network devices (e.g., routers) for provisioning changes to configurations thereon, as well as retrieving data from the network devices. A network management system may require multiple protocols for the provisioning of device configurations and the retrieval of state information. For instance, a Network Configuration protocol such as NETCONF is generally well-suited for facilitating the provisioning of configuration data, but requires the retrieval of state information from a network device to be polled separately. On the other hand, Simple Network Management Protocol (SNMP) allows for the transfer of state information from a network device to a network management system, but is generally a poor choice for updating a configuration of the network device.

Moreover, existing network management interfaces generally only support the transfer of data modeled in a specified schema-definition language. For instance, the SNMP protocol only transfers ASN.1 modelled data, while the NETCONF protocol uses YANG as the schema-definition language for modeling configuration and state data, and XML as the only data encoding. However, modern network devices transitioning to automated interactions for the provisioning of configuration data have evolved to support the transfer of data in multiple formats, such as data models in a standard schema-definition language (e.g., YANG), an industry standard format, or some other structure.

SUMMARY

One aspect of the disclosure provides a method for communicating over a specified protocol enabling bi-directional streaming between a network manager and a network device. The method includes receiving, at data processing hardware of a network device, a request from the network manager requesting data including at least one of state information or configuration information. The request includes a get request to obtain a snapshot of the requested data existing on the network device or a subscribe request to subscribe to updates for the requested data existing on the network device. The method also includes transmitting a data response from the data processing hardware to the network manager via telemetry. The data response includes the requested data having data elements defined by at least one data schema supported by the network device. The capability and data requests and the capability and data responses adhere to a protocol configured to enable bi-directional streaming between the network manager and the network device.

Implementations of the disclosure may include one or more of the following optional features. In some implementations, the method includes receiving, at the data processing hardware, a capability request from the network manager for capability information on the network device and transmitting, from the data processing hardware of the network device, a capability response including the capability information to the network manager via telemetry. The capability information may include one or more data schemas supported by the network device, encodings supported by the network device, and a version of a network management interface service supported by the network device.

In some examples, the get request specifies a set of paths identifying the requested data within one or more schema definition models restricted by the at least one of the data schemas supported by the network device for use by the network device when returning the requested data to the network manager. The get request may also specify at least one of the encodings supported by the network device for use by the network device when serializing the set of paths.

Transmitting the data response may include transmitting a get response including a corresponding notification message for each path specified by the get request. Each notification message may include the snapshot of the requested data for the corresponding path and a timestamp field indicating a time at which the network device took the snapshot of the requested data for the corresponding path. The subscribe request may specify a set of paths identifying the requested data within one or more schema definition models restricted by the at least one data supported by the network device and a subscription mode that indicates triggers for the network device to return the updates for the requested data to the network manager. Transmitting the data response may include transmitting a subscribe response including an update field including one or more notification messages each providing an update value for a corresponding path specified by the subscribe request.

When the subscription mode specified by the subscribe request includes a periodically-polled subscription, the method may include retrieving, by the data processing hardware, the requested data on a per-data element basis from memory hardware in communication with the data processing hardware at a transmission time of the subscribe request and encapsulating, by the data processing hardware, the requested data into the subscribe response. When the subscription mode specified by the subscribe request includes a one-off subscription, the method may include retrieving, by the data processing hardware, the requested data on a per-data element basis for each corresponding path specified by the subscribe request without requiring serialization of the paths specified by the subscribe request simultaneously and encapsulating, by the data processing hardware, the requested data into the subscribe response via multiple notification messages. In some examples, transmitting the subscribe response includes, when the subscription mode specified by the subscribe request includes a Stream subscription, transmitting the subscribe response each time the update value for the corresponding path specified by the subscribe request changes or transmitting the subscribe response during a sample interval specified by the Stream subscription, wherein the subscribe response includes a timestamp indicating a time at which the requested data was sampled.

The method may also include receiving, at the data processing hardware, a set request from the network manager and determining, by the data processing hardware, whether the network manager is able to process the specified one or more operations. The set request may specify one or more operations for the network device to process. When the network manager is able to process the operations specified by the network manager, the method includes processing, by the data processing hardware, the operations and transmitting a set response from the data processing hardware to the network manager. The set response may include a corresponding update result response for each of the processed operations. The update result message may indicate a value for the corresponding processed operation and path of an element of the requested data modified by the corresponding processed operation. When the network manager is unable to process at least one of the operations specified by the network manager, the method may include transmitting the set response from the data processing hardware to the network manager. The set response may include a message field providing an error message indicating that the network manager is unable to process the operations specified by the set request.

One or more operations specified by the set request may include at least one of a delete operation, an update operation or a replace operation. The method may also include, prior to transmitting the data response to the network manager, in response to receiving the data request, authenticating, by the data processing hardware, the network manager. The method may also include determining, by the data processing hardware, whether the network manager is authorized to access the network device for the requested data. The network manager may transmit the data response to the network manager when the network manager is authorized and authenticated.

Another aspect of the disclosure provides a network system for communicating over a specified protocol enabling bi-directional streaming between a network manager and a network device. The network system includes a network manager, a network device, data processing hardware in communication with the network device and memory hardware in communication with the data processing hardware. The memory hardware stores instructions that when executed on the data processing hardware cause the data processing hardware to perform operations. The operations include receiving a request from the network manager requesting data comprising at least one of state information, configuration information, or operational information and transmitting a data response to the network manager via telemetry. The request includes a get request to obtain a snapshot of the requested data existing on the network device or a subscribe request to subscribe to updates for the requested data existing on the network device. The data response includes the requested data having data elements defined by at least one data schema supported by the network device. The capability and data requests and the capability and data responses may adhere to a protocol configured to enable bi-directional streaming between the network manager and the network device.

This aspect may include one or more of the following optional features. In some implementations, the operations include receiving a capability request from the network manager for capability information on the network device and transmitting a capability response comprising the capability information to the network manager via telemetry. The capability information may include one or more data schemas supported by the network device, encodings supported by the network device, and a version of a network management interface service supported by the network device.

The get request may specify a set of paths identifying the requested data within one or more schema definition models restricted by the at least one of the data schemas supported by the network device for use by the network device when returning the requested data to the network manager. The get request may also specify at least one of the encodings supported by the network device for use by the network device when serializing the set of paths. Transmitting the data response may include transmitting a get response including a corresponding notification message for each path specified by the get request. Each notification message may include the snapshot of the requested data for the corresponding path and a timestamp field indicating a time at which the network device took the snapshot of the requested data for the corresponding path.

The subscribe request may specify a set of paths identifying the requested data within one or more schema definition models restricted by the at least one data supported by the network device and a subscription mode that indicates triggers for the network device to return the updates for the requested data to the network manager. Transmitting the data response may include transmitting a subscribe response comprising an update field including one or more notification messages each providing an update value for a corresponding path specified by the subscribe request.

In some examples, the operations include, when the subscription mode specified by the subscribe request includes a periodically-polled subscription, retrieving the requested data on a per-data element basis from the memory hardware at a transmission time of the subscribe request and encapsulating the requested data into the subscribe response. The operations may also include, when the subscription mode specified by the subscribe request includes a one-off subscription, retrieving the requested data on a per-data element basis for each corresponding path specified by the subscribe request without requiring serialization of the paths specified by the subscribe request simultaneously and encapsulating the requested data into the subscribe response via multiple notification messages. Transmitting the subscribe response may include, when the subscription mode specified by the subscribe request includes a Stream subscription, transmitting the subscribe response each time the update value for the corresponding path specified by the subscribe request changes or transmitting the subscribe response during a sample interval specified by the Stream subscription, wherein the subscribe response includes a timestamp indicating a time at which the requested data was sampled.

The operations may also include receiving a set request from the network manager and determining whether the network manager is able to process the specified one or operations. The set request may specify one or more operations for the network device to process. When the network manager is able to process the operations specified by the network manager, the operations include processing the operations and transmitting a set response to the network manager. The set response may include a corresponding update result response for each of the processed operations, the update result message indicating a value for the corresponding processed operation and path of an element of the requested data modified by the corresponding processed operation.

The operations may also include, when the network manager is unable to process at least one of the operations specified by the network manager, transmitting the set response to the network manager. The set response may include a message field providing an error message indicating that the network manager is unable to process the operations specified by the set request. The one or more operations specified by the set request may include at least one of a delete operation, an update operation, or a replace operation. The operations may further include, prior to transmitting the data response to the network manager, in response to receiving the data request, authenticating the network manager and determining whether the network manager is authorized to access the network device for the requested data. The network manager may transmit the data response to the network manager when the network manager is authorized and authenticated.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Interfaces used for interacting with network devices have evolved from those that require human-interaction for the provisioning of configuration data on the network devices. Implementations herein are directed toward a common interface that supports the efficient transfer of state information from a network device (e.g., a router or other access point) to a network management system, as well as allow the network management system to modify and/or retrieve the configuration on the network device. Accordingly, the network management system may use a specified protocol to retrieve both state information and configuration information from the network device, as well as modify the configuration data (i.e., read-write data) on the network device without relying on a human to provision the configuration data. The common interface allows for bi-directional telemetry streams between the network management system and the network device, while providing interaction with a multitude of different schema-definition languages that may be modeled on the network device.

Figure 1A:
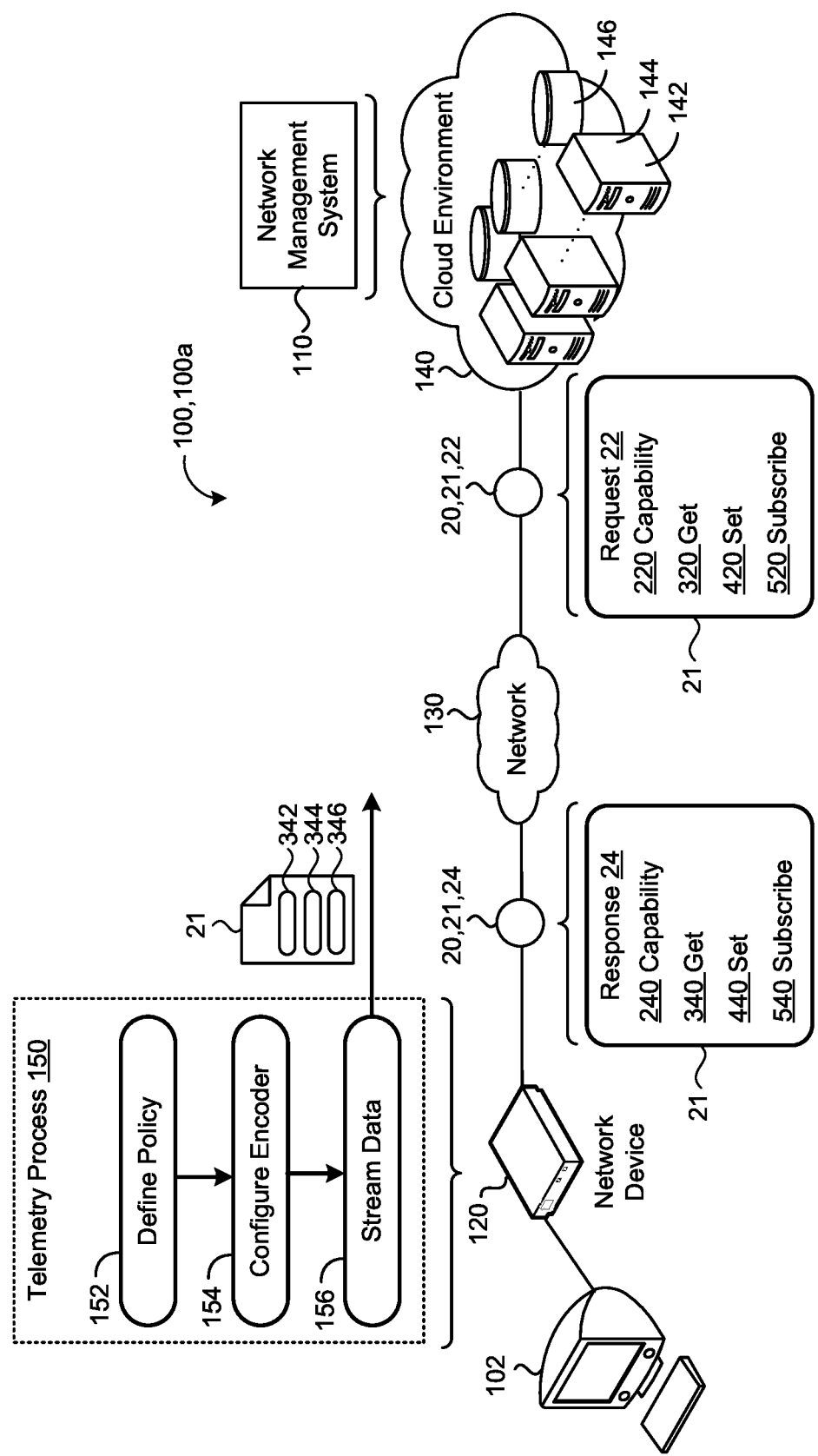
FIG. 1A is a schematic view of an example network device creating a telemetry signal for transmission over a network to a network management system.

Referring to FIG. 1A, in some implementations, a system 100, 100a includes a network device 120 communicating with a remote system 140 over a network 130. The remote system 140 may be a distributed system (e.g., cloud environment) having scalable/elastic resources 142. The resources 142 include computing resources 144 and/or storage resources 146. In some implementations, the remote system 140 executes a network management system (NMS) 110 that specifies a protocol for transmitting and receiving communications 20 to and from the network device 120. The specified protocol enables bidirectional communications 20 between the NMS 110 and the network device 120. As used herein, a communication 20 refers to a request message 22 the NMS 110 transmits over the network 130 to the network device 120 using telemetry, or a response message 24 the network device 120 transmits over the network 130 to the NMS 110 using telemetry. As used herein, the term "telemetry" refers to streaming data 21 corresponding to data 21 requested by the NMS 110 in the request message 22, or data 21 retrieved by the network device 120 and returned/transmitted to the NMS 110 in the response message 24. The telemetry data 21 may include configuration information 342, state information 344, and/or operational information 346 associated with the network device 120 for use by the NMS 110.

The protocol specified by the NMS 110 for communicating with the network device 120 allows the NMS 110 to view the operational state and/or the configuration of the network device 120. In some implementations, the NMS 110 executes changes to the operational state and/or the configuration of the network device 120. Accordingly, the network device 120 may transmit telemetry data 21 containing the configuration and/or operating state of the network device 120 at a given time to the NMS 110, and the NMS 110 may provision configuration data 21 for network device 120 as needed without the need of the network device 120 requiring human-interaction (e.g., network administrator) to provision the configuration of the network device 120.

The network device 120 includes a device communicating with other devices, systems, and/or networks. For instance, the network device may correspond to a router, a switch, a remote node, a firewall, a security device, an access point, a thermostat, a modem, or any other communication device that may process and/or forward network traffic. The network device 120 may be a standalone device or may be operatively connected to a user device 102 for connecting the user device 102 to the network 130. In some examples, the user device 102 (e.g., a desktop computer or laptop) implements the network device 120. Thus, the network device 120 may correspond to other communication devices such as a computing device, a mobile device, or some other user terminal.

Figure 5A:
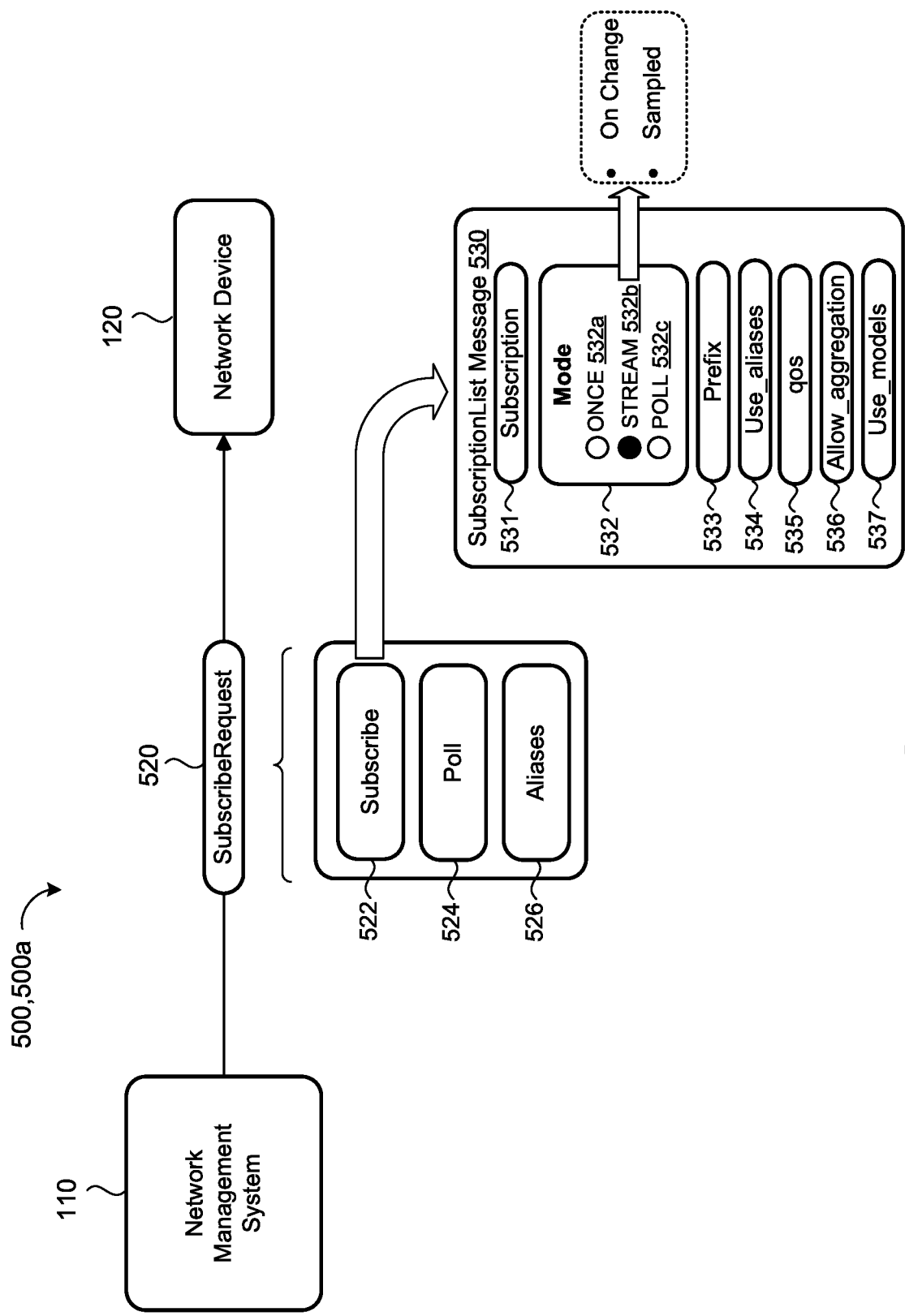
FIG. 5A is a schematic view of an example network device receiving a subscribe request from a network management system for subscribing to updates for data existing on the network device.
Figure 5B:
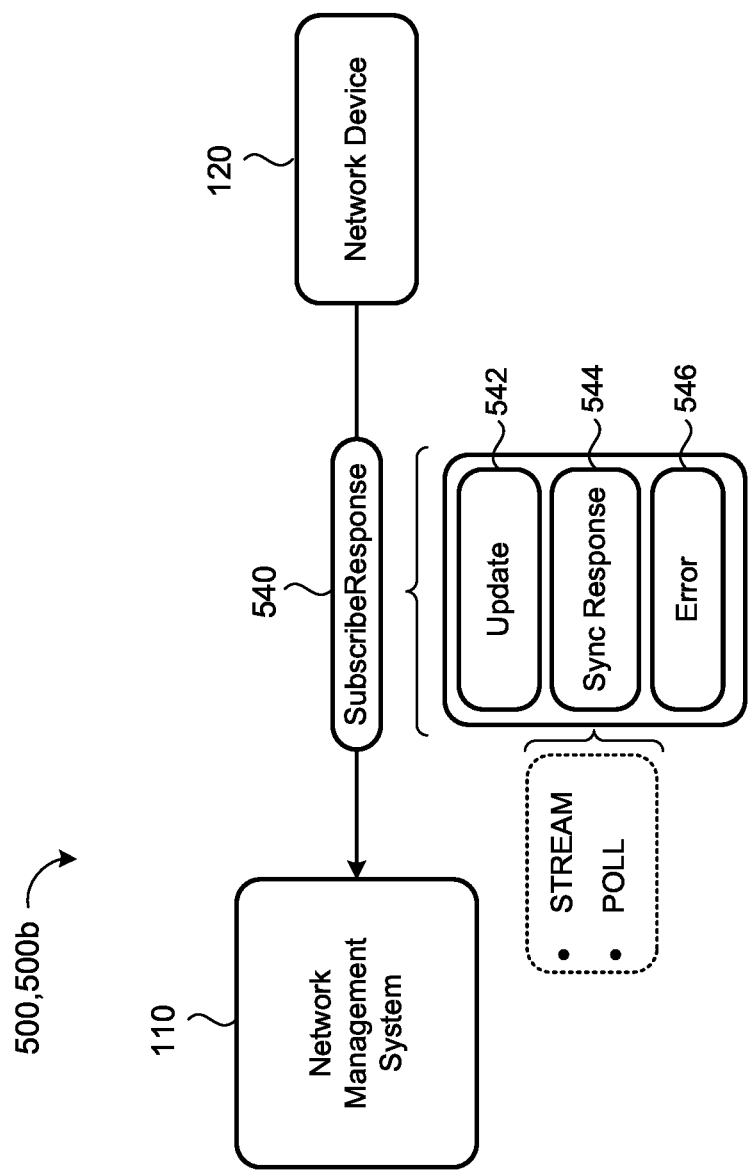
FIG. 5B is a schematic view of the network device of FIG. 5A transmitting a subscribe response including one or more notification messages each providing an update value for a corresponding path specified by the subscribe request.

In some implementations, the specified protocol enabling the bi-directional telemetry communications 20 includes a Remote Procedure Call (RPC) configured to allow the NMS 110 to retrieve and modify the configuration of the network device 120, as well as control and generate the telemetry streams of data 21 from the network device 120 to the NMS 110 via the network 130. In some examples, the specified protocol is an gRPC-based protocol that allows a single implementation on both the NMS 110 and the network device 120 to interact with one another via telemetry and configuration RPCs. All messages within the gRPC service definition are defined as protocol buffers (e.g., proto3 protocol buffer). The protocol may carry payloads containing data instances of OpenConfig YANG schemas, or any data instances with characteristics having (1) a structure that can be represented by a tree structure where nodes can be uniquely identified by a path including node names, or node names coupled with attributes, and (2) values capable of being serialized into a scalar object. For instance, values may be serialized to a scalar object through encoding as a JavaScript Object Notation (JSON) string, a byte-array, a serialized protobuf object, or some other defined serialization. Accordingly, streaming telemetry is a paradigm for network monitoring in which data 21 is streamed bi-directionally between the network device 120 and the NMS 110 continuously with efficient, incremental updates. In the examples of FIGS. 5A and 5B, the NMS 110 subscribes to specific data instances of the network device 120 identified by path names using data models (e.g., data schemas) supported by the network device 120.

FIG. 1A shows the NMS 110 using the specified protocol to transmit a communication 20 in the form of a request 22 over the network 130 to the network device 120. Here, the NMS 110 transmits the request 22 to query and/or modify data 21 on the network device 120, or operate as a collector for streamed data 21 output from the network device 120. The request 22 may include streaming telemetry data 21 corresponding to the following RPCs: a CapabilityRequest 220 (FIG. 2B); a GetRequest 320 (FIG. 3); a SetRequest 420 (FIG. 4A); or a SubscribeRequest 520 (FIG. 5A).

On the other hand, FIG. 1A shows the network device 120 using the specified protocol (e.g., gRPC) to transmit a communication 20 in the form of a response 24 over the network 130 to the NMS 110 in response to receiving the request 22. The network device 120 transmits the response 24 to provide data 21 requested by the NMS 110 in the request 22, or to provide changes made to the underlying data 21 on the network device 120. The response 24 may include streaming telemetry data 21 corresponding to the following RPCs: a CapabilityResponse 240 (FIG. 2B); a GetResponse 340 (FIG. 3); a SetResponse 440 (FIG. 4B); or a SubscribeResponse 540 (FIG. 5B).

In some implementations, the network device 120 executes a telemetry process 150 for streaming the data 21 in real-time via telemetry. The telemetry process 150 includes a Define Policy step 152, a Configure Encoder step 154, and a Stream Data step 156 for streaming the data 21 to the NMS 110. At the Define Policy Step, the telemetry process 150 defines a streaming frequency for streaming the data 21. The Define Policy step 152 may determine a schema path of the data 21 to be streamed, create a policy file having a description, identifier, and version, and add the path to a policy file for encoding at the Configure Encoder step 154. The path may be specified by the NMS 110 in the request 22 received by the network device 120.

At the Configure Encoder step 154, the telemetry process 150 specifies a format for the collected data 21 and encodes the data 21 using the specified schema. For instance, the telemetry process 150 may encode the data 21 using a protocol buffer compact encoding to convert the policy paths into proto files, and thereafter, configure the telemetry for streaming the data 21. In other examples, the telemetry process 150 may encode the data 21 using JSON and protocol buffer key-values before configuring the telemetry for streaming the data 21.

In some examples, the NMS 110 specifies the format for the network device 120 to use in the request 22. At the Stream Data step 156, the telemetry process 150 streams the encoded data 21 to the NMS 110. The encoded telemetry data 21 may include the configuration information 342, the state information 344, and/or operational information 346 associated with the network device 120 for use by the NMS 110.

Figure 1B:
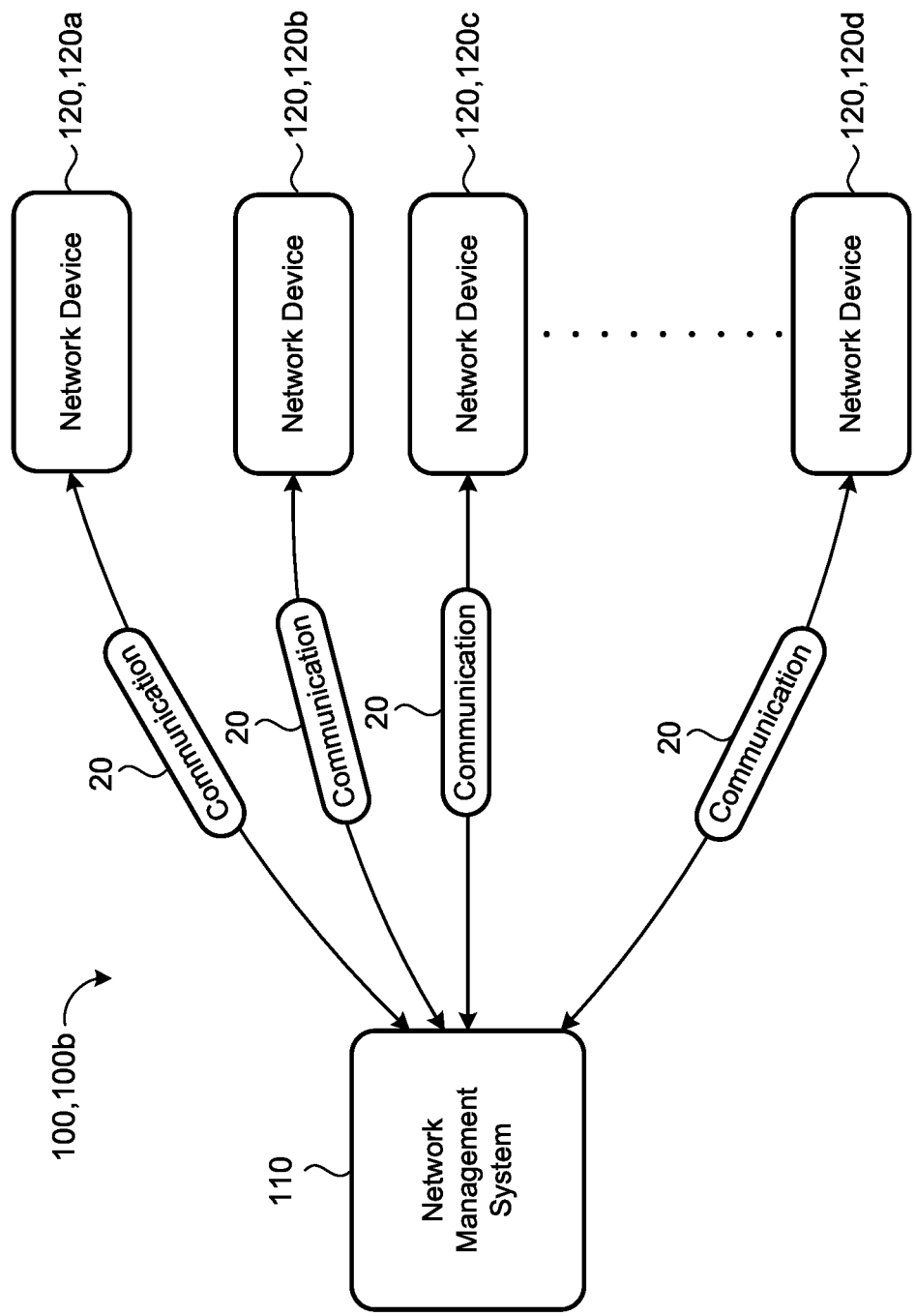
FIG. 1B is a schematic view of an example network management system transmitting and receiving communications to and from a plurality of network devices.

Referring to FIG. 1B, in some implementations, a system 100, 100b includes the NMS 110 using the specified protocol (e.g., gRPC protocol) for transmitting and receiving telemetry communications 20 to and from a plurality of network devices 120, 120a-n. Here, each communication 20 transmitted from the NMS 110 to each network device 120 contains a request 22 to query and/or modify data 21 on the corresponding network device 120, or operate as a collector for streamed data 21 output from the corresponding network device 120. Similarly, each communication 20 received by the NMS 110 from the network devices 120 contains a corresponding response 24 including data 21 requested by the NMS 110 or updates that indicate changes made to the underlying data 21 on the corresponding network device 120.

A communication session between the NMS 110 and the network device 120 must be encrypted and neither the NMS 110 nor the network device 120 may revert back to unencrypted channels during the communication session. In some examples, the communication session is encrypted using Transport Layer Security (TLS) that supports a multitude of methods for exchanging keys, encrypting data 21, and authenticating message integrity between the NMS 110 and the network device 120. In some examples, connections for new communication sessions are mutually authenticated. For instance, the NMS 110 and the network device 120 may each validate digital certificate from the other entity to ensure that the remote entity is both known, and authorized to connect to the local entity.

Figure 2A:
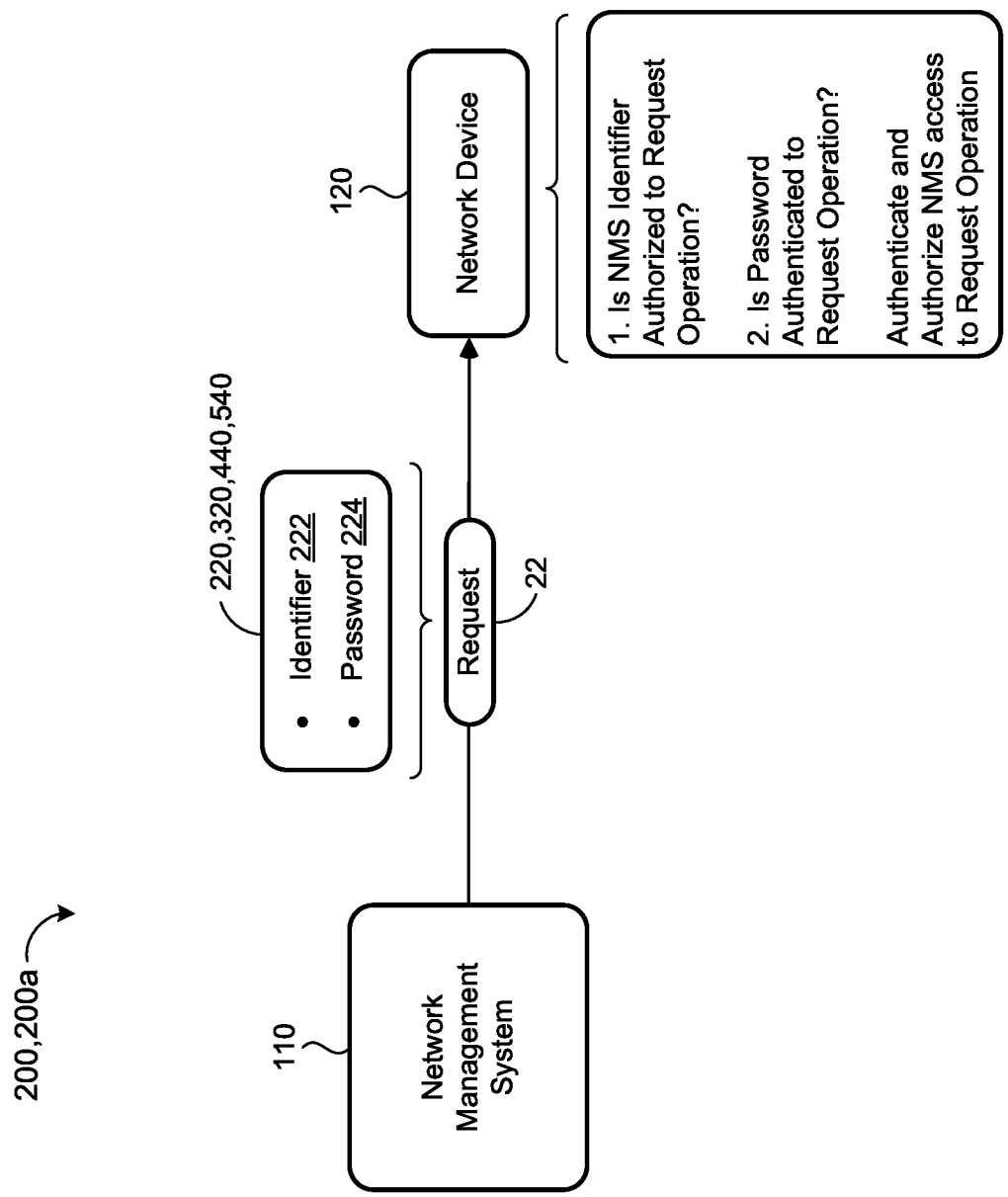
FIG. 2A is a schematic view of an example network device authorizing and authenticating a network management system requesting access to the network device.

In some implementations, a network device 120 authenticates an RPC request 22 from the NMS 110. Referring to FIG. 2A, a schematic view 200a shows the NMS 110 streaming an RPC request 22 to the network device 120 that contains an identifier 222 and a password 224 in the metadata 21 of the RPC request 22 (e.g., the CapabilityRequest 220, the GetRequest 320, the SetRequest 420, or the SubscribeRequest 520). The network device 120 may determine if the identifier 222 is authorized to request the corresponding RPC operation, and if determine if the password 224 is authenticated to request the corresponding RPC operation. If the identifier 222 is authorized and the password 224 is authenticated, the network device 120 may authenticate and authorize the NMS 110 access to the network device 120 for performing the corresponding RPC operation specified in the request 22. Otherwise, the network device 120 may provide an error message in a response 24 informing the NMS 110 that the identifier 222 is not authorized and/or the password 224 is not authenticated. In examples when the NMS 110 only provides the identifier 222 in the RPC request 22, the network device 120 only authorizes the RPC request 22 without requiring the network device 120 to authenticate a password 224.

Figure 2B:
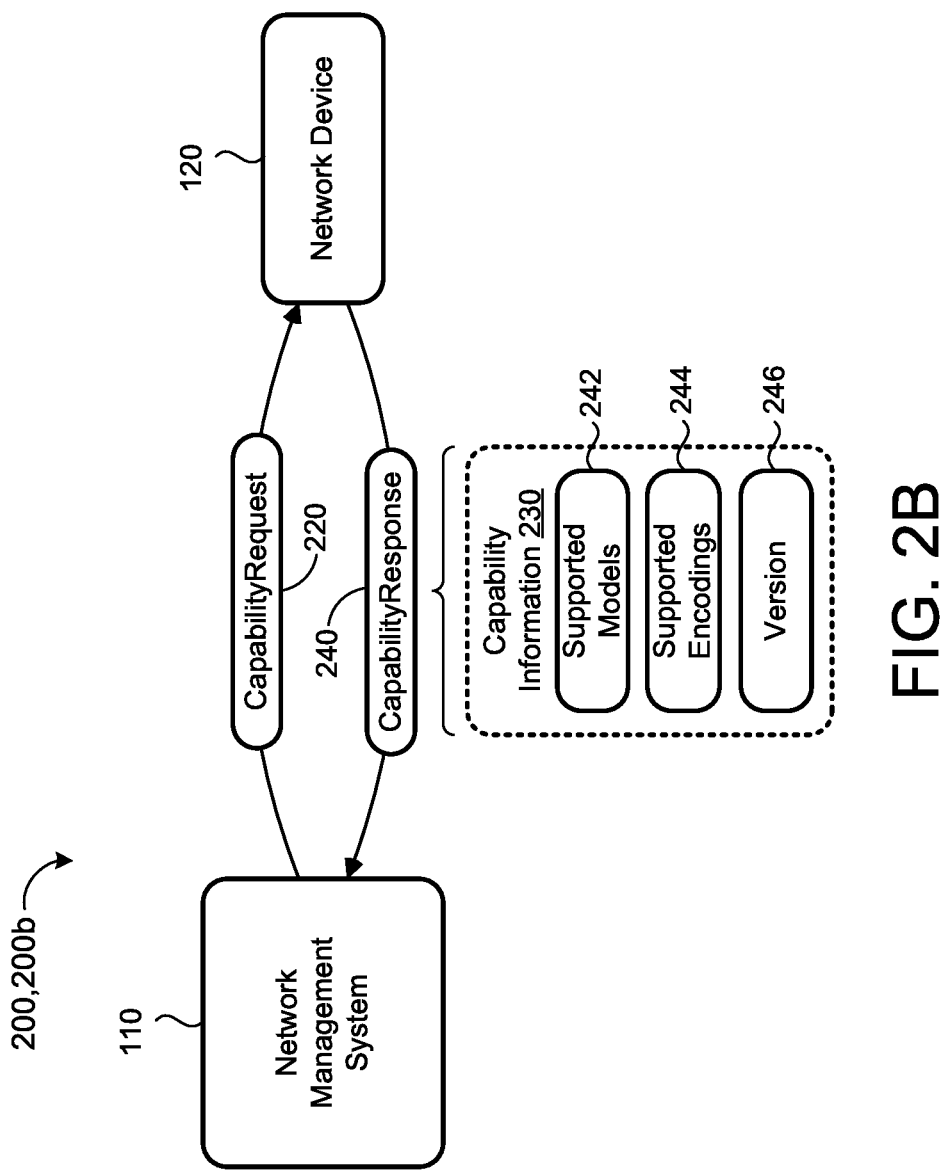
FIG. 2B is a schematic view of an example network device transmitting a capability response including capability information to a network management system.

Referring to FIG. 2B, the NMS 110 uses the CapabilityRequest 220 to obtain capability information 230 from the network device 120. The CapabilityRequest 220 is an RPC used by the NMS 110 and the network device 120 as an initial handshake to exchange capability information 230. In some implementations, when the NMS 110 transmits the CapabilityRequest 220 to the network device 120, the network device 120 must reply with a CapabilityResponse 240 containing the capability information 230 for the network device 120. The capability information 230 includes a supported models field 242, a supported encodings field 244, and a network management interface (NMI) version field 246.

The supported models field 242 includes a set of model data messages each associated with a specific data model supported by the network device 120. As used herein, a data model refers to a data schema setting forth a data structure (e.g., data tree) for data 21 associated with the network device 120. Each model specified by a corresponding model data message may refer to a specific data schema, a bundle of modules, or an augmentation or deviation. Accordingly, each model data message contains a name field associated with the name of the model expressed as a string, an organization filed associated with the organization publishing the model expressed as a string, and a version field associated with the supported version of the model expressed as a string which represents the semantic version of a catalog entry. The combination of name, organization, and version uniquely identifies an entry in the model catalog.

The data tree supported by the network device 120 is defined by a set of data schemas and the NMS 110 may obtain these data schemas supported by the network device 120 so that NMS 110 can generate valid modifications to the data tree, and interpret the data 21 returned by Get and Subscribe RPC calls. In some examples, the NMS 110 obtains the set of model data messages from the supported models field 242 for subsequently restricting a set data schemas used by the network device 120 so that the NMS 110 may validate data 21 returned from the network device 10 against a specific set of data schemas. Here, the NMS 110 may validate the data 21 even if the network device 120 adds new values to restricted value data elements (e.g., those representing an enumerated type), or augment new data elements into the data tree. In some implementations, the NMS 110 specifies the schemas/models for use by the network device 120 in subsequent GetRequest 320 and/or SubscribeRequest 520 RPCs transmitted to the network device 120. In these implementations, the network device 120 must utilize data tree elements defined in data schema models outside the specified set of models specified by the NMS 110 when responding with corresponding GetResponse 340 and/or SubscribeResponse 540 RPCs returned to the NMS 110.

The supported encodings field 244 included in the CapabilityResponse 240 contains an enumeration field associated with the data encodings supported by the network device 120. For instance, the network device 120 may support JSON encodings such in the case that a data item at a specified path is a leaf node (e.g., has no children) the value of the leaf is encoded directly, i.e., no JSON object is required and a bare JSON value is included. Conversely, when the data item has child nodes, the value field contains a serialized JSON entity (e.g., object or array) corresponding to the referenced item. The NMI version field 246 may specify the semantic version of the service supported by the network device 120, as specified as a string.

Figure 3:
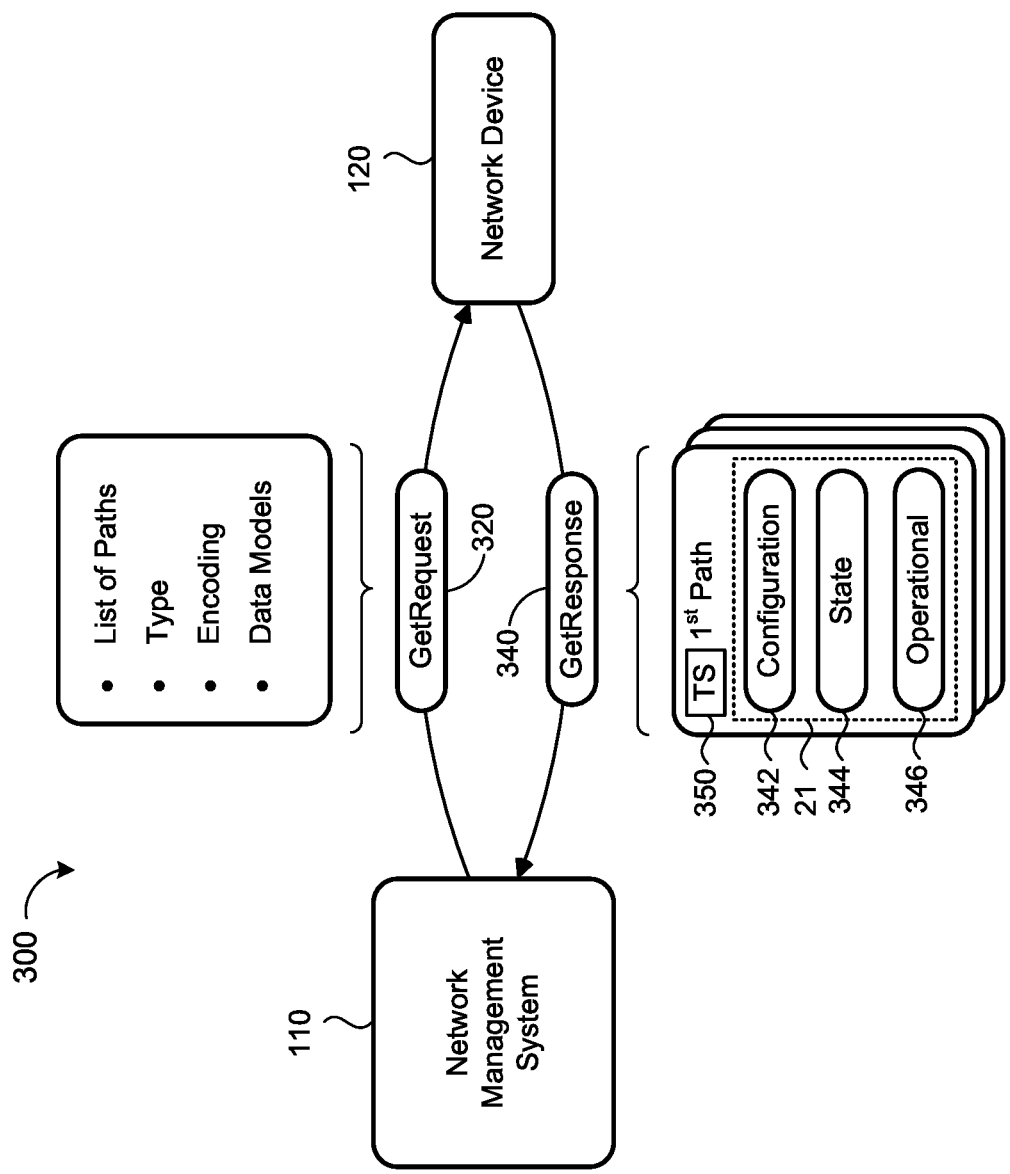
FIG. 3 is a schematic view of an example network device receiving a get request from a network management system and returning a get response to the network management system.

Referring to FIG. 3, in some implementations, the NMS 110 transmits the GetRequest 320 to the network device 120 to obtain a snapshot of data 21 (e.g., configuration or state) existing on the network device 120. The network device 120 may collect and transmit the data 21 to the NMS 110 in the GetResponse 340. Accordingly, the GetRequest 320 allows the NMS 110 to request a set of paths for the network device 120 to serialize and transmit to the NMS 110. In response to receiving the GetRequest 320, the network device 120 serializes the requested paths and returns the GetResponse 340. Here, the GetResponse 340 must reflect the values of the specified leaves at a particular collection time, which may be different for each path specified in the GetRequest 320. In some implementations, the network device 120 closes the channel established by the GetRequest 320 upon transmitting the GetResponse 340 to the NMS 110.

Generally, the NMS 110 uses the GetRequest 320 RPC to retrieve a relatively small set of data 21 from the network device 120 as a complete object, e.g., as part of the configuration. Accordingly, the GetRequest 320 is not expected to place a significant resource burden on the network device 120 when retrieving the data 21. As the network device 120 is expected to return an entire snapshot of the requested data in the GetResponse 340 RPC, the GetRequest 320 is not well-suited for retrieving very large data sets, such as the full contents of the routing table or the entire component inventory of the network device 120. Instead, the NMS 110 may use the SubscribeRequest 520 RPC of FIG. 5A when it is desirable to retrieve large data sets from the network device 120.

The GetRequest 320 may include a list of paths field, a type field, an encoding field, and a data model field. The list of paths field identifies a set of paths for which the NMS 110 is requesting a data snapshot from the network device 120. The path may use wildcards, and in the case that a specified path is not valid, the network device 120 must populate an error field in the GetResponse 340 indicating the invalid path. In some examples, the GetRequest 320 includes a prefix for each path within the GetRequest 320.

In some implementations, paths are represented according to OpenConfig Path Conventions, a simplified form of XPATH. Here, the path is represented by an ordered list of strings, beginning with the root node, and ending at the most specific path element. Each path may be presented with an element field, including a set of path elements encoded as strings, and an origin field, which may be used to disambiguate the path if necessary (e.g., the origin may be used to indicate which organization defined the data schema associated with the path). Accordingly, each path element should correspond to a node in the data tree (e.g., data structure). For example, the path/a/b/c/d may be encoded as:

```
Path: <
    element: "a"
    element: "b"
    element: "c"
    element: "d"
<
```

Moreover, attributes may be specified alongside the node name within the path element. For example, a node specified by/a/e[key=k1]/f/g would include a path encoded as:

```
Path: <
    element: "a"
    element: "e[key=k1]"
    element: "f"
    element: "g"
<
```

Paths defined with the concatenation of the Prefix and Path and specified within the RPC request 22 (e.g., GetRequest 320, SetRequest 420, or SubscribeRequest 520) must be absolute such that no RPCs with relative paths are generated. Additionally, the root node ('/') may be indicated by encoding a single path element as an empty string as follows:

Path: <
  element: ""
<

The type field indicates the type of data 21 requested from the network device 120. The type may include configuration information 342, state information 344, and/or operational information 346 for the network device 120. The configuration information 342 includes readable and/or writable properties (e.g., read/write data 21) on the network device 120 and may be represented by a specific set of schema models supported by the network device 120. For instance, if the data schema includes YANG, the configuration information 342 may correspond to a "config true" set of leaves on the network device 120. On the other hand, the state information 344 includes read-only data on the network device 120. In Yang, the state information 344 may correspond to a "config false" set of leaves on the network device 120. However, some data schemas may express the state information 344 as text (e.g., On, Off, Fault) while other data schemas may express the state information as integers (e.g., 0, 1, 2). The state information 344 may also be more specific than simply indicating On/Off/Fault states for the network device 120. For instance, the state information 344 may indicate whether or not the network device 120 is transmitting/receiving or provide a value for the signal strength of the network device 120. The operational information 346 includes read-only data 21 on the network device 120 that is related to software processes operating on the network device 120, or external interactions on the network device 120.

For each path specified by the GetRequest 320, the GetResponse 340 returned to the NMS 110 from the network device 120 provides a corresponding Notification message that includes a timestamp 350 field indicating a time at which the network device 120 took a snapshot of the data 21 for the corresponding path. For instance, FIG. 3 shows the GetResponse 340 returning a Notification message including a snapshot of data 21 at timestamp TS 350 for a first path specified in the GetRequest 320. Here, the data 21 may include any of the configuration information 342, the state information 344, and/or the operational information 346 specified in the type field of the GetRequest 320. In scenarios when the GetRequest 320 does not specify the type of data 21, the network device 120 may return each of the configuration information 342, the state information 344, and the operational information 346 in the tree resulting from the query associated with the GetRequest 320 from the NMS 110. The GetResponse 340 may include additional Notification messages for each additional path when the GetRequest 320 provides a list of paths. The snapshot of data 21 includes a snapshot of configuration information 342, state information 344, and/or operational information 346 for the network device 120. In some implementations, the GetResponse 340 does not collapse data from multiple paths into a single notification within the GetResponse 340.

The timestamp TS 350 field of the GetResponse 340 may be represented as a number of nanoseconds since a Unix epoch (e.g., Jan. 1, 1970 00:00:00 UTC), and is generally encoded as a signed 64-bit integer (int64). As the timestamp TS 350 returned in the GetResponse 340 is associated with an entire set of data 21, individual data items may have been sampled/retrieved by the network device 120 at different times. Accordingly, the NMS 110 may use the SubscribeRequest 520 RPC of FIG. 5A to request a telemetry stream (e.g., SubscribeResponse 540 of FIG. 5B) when the NMS requires higher accuracy for individual data items of the retrieved data set.

The GetResponse 340 may also a prefix field and/or an alias field. The prefix is a prefix applied to all encoded path fields included in the GetResponse 340. Generally, the prefix always precedes the path elements. For instance, the paths expressed within the GetResponse 340 may be formed by the concatenation of prefix+path. The alias is a string providing an alias for the prefix specified within the GetResponse 340. In some scenarios, the NMS 110 or network device 120 desires to use aliases for a particular path such subsequent RPCs (e.g., GetResponse 340, SetResponse 440, and/or SubscribeResponse 540) can be compressed utilizing the alias, rather than using a complete representation of the path. Thus, the use of the alias may remove redundant information to reduce a total message length of the subsequent RRCs. In examples when the network device 120 fails to provide support path aliases, a maximum length of the subsequent RPCs should be considered, especially in terms of bandwidth utilization, and the efficiency of message generation. Moreover, a path alias may be encoded as a string and have a name prefixed with a # character to avoid clashing between valid data paths and aliases. The network device 120 may specify the aliases as fully expanded paths so that a single alias lookup is sufficient to resolve an absolute path.

In some implementations, the GetResponse 340 provides an Error message to indicate errors in the GetRequest 320 received by the network device 120 from the NMS 110. The Error messages are represented by a canonical RPC (e.g., gRPC) error code for a specified programming language (e.g., Java, Golang, C++). In some examples, the network device 120 specifies a free-text string indicating the context of the error to allow the NMS 110 to generate log entries that allow a human operator to understand the exact error that occurred, as well as the context of the error. Generally, the network device 120 will choose the canonical error code based on an expected behavior of the NMS 110 upon receiving the Error message in the GetResponse 340. For instance, error codes indicating that the NMS 110 may subsequently retry sending the GetRequest 320 may be used when retrying the GetRequest 320 is expected to result in a different outcome, i.e., a valid outcome. The Error message may include a code, message, and data fields. The code corresponds to an unsigned 32-bit integer value corresponding to the canonical gRPC code and the message includes the human-readable string describing the error condition in greater detail. Here, the string is not expected to be machine-parsable, but rather provide contextual information which may be passed to other upstream systems or devices. The data provides an arbitrary sequence of bytes to provide further contextual information relating to the error. This arbitrary sequence of bytes may be encoded as proto.Any.

Figure 4A:
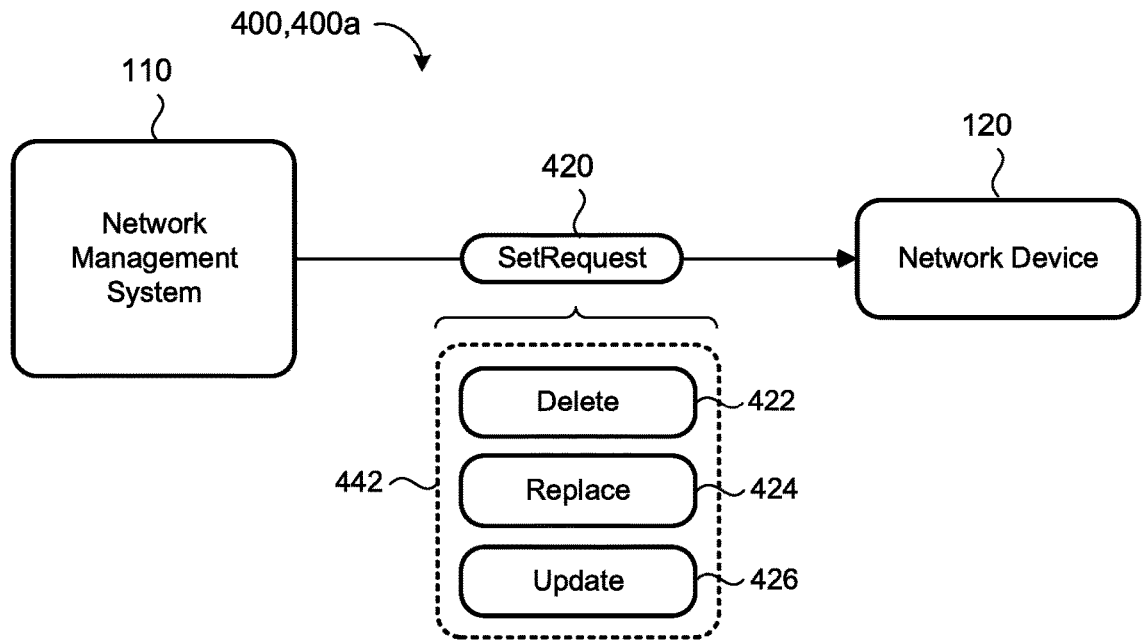
FIG. 4A is a schematic view of an example network device receiving a set request specifying one or more operations for the network device to process.
Figure 4B:
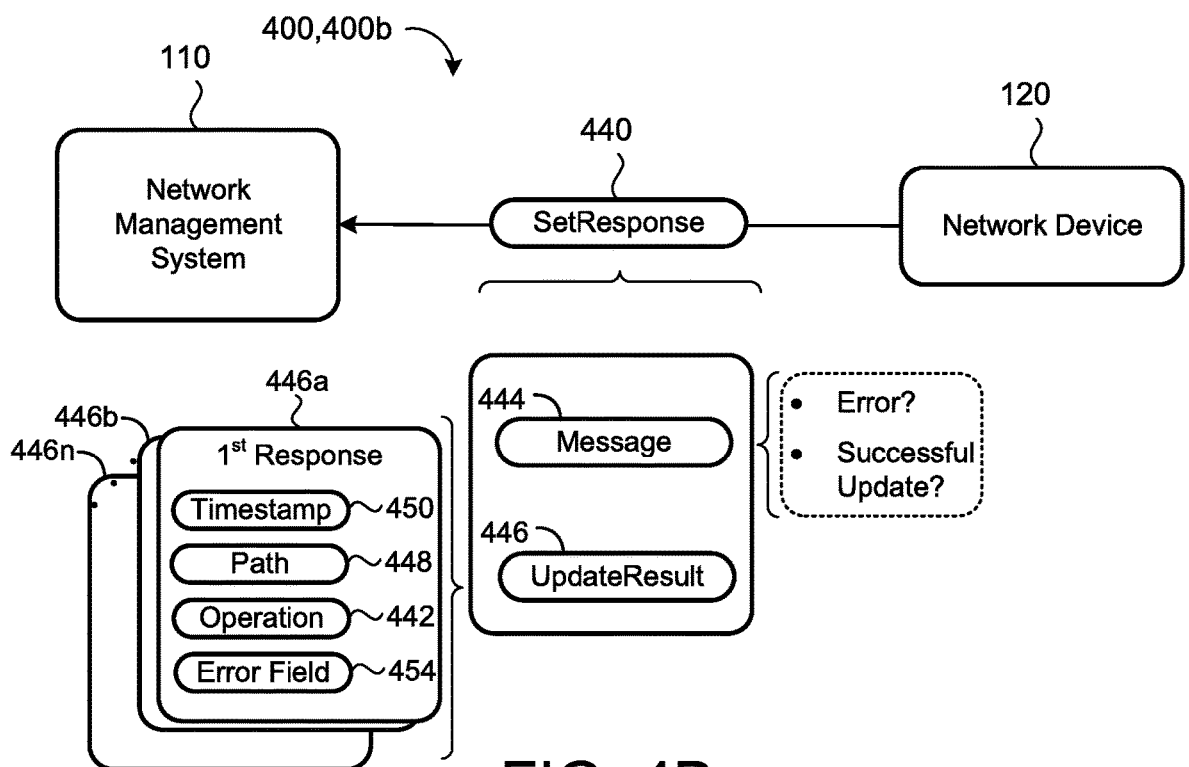
FIG. 4B is a schematic view of the network device of FIG. 4A transmitting a set response including at least one update result response after processing the one or more operations.

Referring to FIGS. 4A and 4B, in some implementations, the NMS 110 transmits a SetRequest 420 RPC (FIG. 4A) to the network device 120 that specifies one or more operations 442 for the network device 120 to process, and after processing each of the operations 442, the network device 120 returns a corresponding SetResponse 440 RRC (FIG. 4B) providing an UpdateResult message 446 (FIG. 4B) for each of the processed operations 442. The NMS 110 may transmit the SetRequest 420 to the network device 120 to modify the state of the network device 120, and the network device 120 processes the operations 442 specified in the SetRequest 420

FIG. 4A shows SetRequest 420 RPC transmitted to the network device 120 including operational fields of Delete 422, Replace 424, and/or Update 426 to specify the one or more operations 442 for processing by the network device 120. The SetRequest 420 may specify a prefix that is applied to all paths defined within the fields 422, 424, 426 of the SetRequest 420. The Delete field 422 specifies a set of paths for removal from the data tree of the network device. As with the set of paths specified in the GetRequest 320 RPC of FIG. 3, each path in the Delete field 422 of the SetRequest 420 may be represented by an ordered list of strings, beginning with the root node, and ending at the most specific path element. Each path may be presented with an element field, including a set of path elements encoded as strings, and an origin field, which may be used to disambiguate the path if necessary (e.g., the origin may be used to indicate which organization defined the data schema associated with the path). Accordingly, each path element should correspond to a node in the data tree (e.g., data structure)

The Replace field 424 provides a set of Update messages that specify elements/paths of the data tree whose content is to be replaced. The Update field 426 provides a set of Update messages indicating elements/paths of the data tree whose content is to be updated. In some examples, the Replace field 424 and/or the Update field 426 utilizes a re-usable Update message to indicate changes to paths where a new value is required. An Update message may include a path field, providing an encoded path indicating the path of an element to be modified (e.g., replaced or updated), and a value field, providing an encoded value indicating the value applied to the specified node such that the node is updated based upon the context of the Update message. Generally, the Replace and Update fields 424, 426 of the SetRequest 420 specify changes/modifications to the read-write values (e.g., configuration information 342) on the network device 120. The operations 442 specified in the Replace field 424 must consider the behavior regarding any omitted data elements in the Update field 426 based on whether the omitted data elements refer to non-default values (e.g., set by a previous SetRequest 420), or unmodified defaults. When the Replace field 424 omits previously-set values, these values must be treated as deleted from the data tree. Otherwise, omitted data elements must be created with their default values on the network device 120. On the other hand, the operations 442 specified in the Update field 426 only treat the value of those data elements explicitly specified therein as changed.

For both replace and update operations 442, if the path specified in the corresponding path field does not exist, in some implementations, the network device 120 creates a data tree element and populates the data tree element with data 21 included in the Update message specified in the corresponding Replace field 424 or the corresponding Update field 426 when the path does not exist. When invalid values are specified, the network device 120 may cease processing updates within the SetRequest 420, return the data tree to the state prior to any changes, and return the SetResponse 440 indicating the error associated with the invalid value.

The network device 120 treats the received SetRequest 420 as a transaction by processing the operations 442 (e.g., delete, replace, and/or update) contained therein. In some implementations, the network device 120 processes the deleted paths (i.e., as specified in the Delete field 422), followed by the paths to be replaced (i.e., as specified in the Replace field 424), and lastly the paths to be updated (i.e., as specified in the Update field 426). The network device 120 must consider the order of Replace and Update fields 424, 426 included in a single SetRequest 420. For instance, if a single path is specified multiple times for a single operation 442 within the Replace field 424 or the Update field 426, then the state of the network device 120 must reflect the application of all of the operations 442 in order, even if the operations 442 overwrite one another.

Where a path is contained within the Delete field 422 of the SetRequest 420, it should be removed from the data tree of the network device 120. In examples when the path specified corresponds to an element having children, these children must be recursively deleted. In some implementations, the use of wildcard paths must be expanded by the network device 120, and the corresponding elements of the data tree deleted. In these implementations, such wildcards must support paths specifying a subtree of attributes required to identify entries within a collection (e.g. list, array, or map) of the data schema.

All changes corresponding to the state of the network device 120 included in an individual SetRequest 420 are considered part of a transaction. In other words, either all modifications with the SetRequest 420 are processed by the network device 120, or the network device 120 must rollback the state changes to reflect the state of the network device 120 before any changes were applied. Accordingly, the network device 120 does not reflect a change until all changes have been accepted and processed successfully. Hence, telemetry update messages (e.g., SetResponse 440) must not reflect a change in state until such time as the intended modifications to the underlying data 21 have been accepted by the network device 120. Accordingly, a "transaction" refers to a single SetRequest 420 specifying a set of changes to be applied together and encapsulated within the single SetRequest 420.

FIG. 4B shows SetResponse 440 RPC transmitted to the NMS 110 after the network device 120 processes the operations 442 specified in the received SetRequest 420 of FIG. 4A. The SetResponse 440 may specify the prefix that is applied to all paths defined within the fields 422, 424, 426 of the SetRequest 420. In some implementations, the SetResponse 440 includes a Message field 444 and an UpdateResult field 446.

The Message field 444 generally indicates the completion status of the entire transaction processed by the network device 120. Thus, the Message field 444 indicates whether the network device 120 successfully processed all of the operations 442 specified by the SetRequest 420. For instance, the Message field 444 may provide an error message when an update was not successfully applied to the contents of the data 21. The Error message may include the code, message, and data fields as described above with respect to the Error message of the GetResponse 340 of FIG. 3. The error message may include an error code of "ok" when the modifications/changes to the data 21 for the entire transaction were successful. In some implementations, when the NMS 110 transmits the SetRequest 420, and the network device 120 is unable to apply/process any of the specified changes, the network device 120 reports the error message in the Message field 444 of the SetResponse 440 as well as in the UpdateResult field 446 under an Error field 545 for an individual operation associated with the error. Accordingly, the network device 120 determines an entire transaction fails when network device 120 fails to process any operation 442 specified by the SetRequest 420. Here, the error code for the Message field 444 may be set to Aborted, while the error code for the Error field 454 within the UpdateResult field 446 associated with the failed operation 442 may be set to Error.

The UpdateResult field 446 provides a list of UpdateResult responses 446a-n each associated with a corresponding operation 442 specified by the SetRequest 420 in the Delete, Replace, and Update fields 422, 424, and 426, respectively. For instance, a first UpdateResult response 446a contains a timestamp TS field 450, a path field 448, the operation 442, and the error field 454 for the underlying operation 442 specified by the SetRequest 420. As with the timestamp TS field 350 for the GetResponse 340 of FIG. 3, the timestamp field 450 includes an encoded timestamp indicating the time at which the SetRequest 420 RPC was accepted by the network device 120. The path field 448 includes the path specified by the SetRequest 420 (e.g., within one of the Delete, Replace, or Update fields 422, 424, 426) for the corresponding operation 442, and in scenarios when the SetRequest 420 fails to use a common prefix, the network device 120 may specify a prefix to reduce repetition of path elements within other ones of the UpdateResult responses 446n. The Operation field 442 provides the operation (e.g., a value equal to one of Delete, Replace, or Update) corresponding to the specified path in the path field 448.

The Error field 454 provides the error message when the network device 120 fails to, or is otherwise unable to, process the corresponding operation 442. The Error message may include the code, message, and data fields as described above with respect to the Error message of the GetResponse 340 of FIG. 3. The Error field 454 may set the error coded to "ok" when the operation 442 is successful. In some examples, the error message within the Error field 454 is set to "Unauthorized" when the NMS 110 specifies metadata in the SetRequest 420 requiring authentication by the network device 120 to perform the corresponding operation. On the other hand, the Error field 454 may be set to "PermissionDenied" when the NMS 110 does not have permission to modify the path specified by the corresponding operation 442. Moreover, when the underlying operation 442 specifies a path that cannot be parsed by the network device 120, the Error field 454 may be set to "InvalidArgument" such that the message field of the Error message includes human-readable text indicting that the path associated with the underlying operation 442 could not be parsed. In implementations when the operation 442 is an update or replace operation specifying an invalid path, the Error field 454 may be set to "NotFound" such that the message field of the Error message includes human-readable text indicting that the path associated with the underlying operation 442 is invalid. Moreover, the Error field 454 may be set to "InvalidArgument" when the operation 442 is an update or replace operation that includes an invalid value within the corresponding Update message in the Replace field 424 or Update field 426 of the corresponding SetRequest 420. Generally, the "InvalidArgument" error code is used in scenarios when the payload specifies scalar values that do not correspond to the correct schema type, and in scenarios when multiple values are specified using a particular encoding (e.g., JSON) which cannot be decoded by the network device 120.

Referring to FIGS. 5A and 5B, in some implementations, the NMS 110 transmits a SubscribeRequest 520 RPC (FIG. 5A) to the network device 120 that specifies one or more updates associated with the state of data 21 (e.g., data instances) on the network device 120, and the network device 120 returns ongoing SubscriptionResponse 540 RPCs (FIG. 5B) each relating to the state of the data tree (e.g., configuration, state, and/or operational) specified by the SubscribeRequest 520. The SubscribeRequest 520 may specify a subscription mode 532 that indicates triggers for updates for data 21 sent from the network device 120 in the SubscribeResponse 540. All requests for new subscriptions may be encapsulated within the SubscribeRequest 520 RPC. The SubscribeRequest 520 may specify the subscription mode 532 to include one of a ONCE subscription 532a, a STREAM subscription 532b, or a POLL Subscription 532c. The ONCE subscription 532a includes a subscription having a dedicated stream (e.g., telemetry) to return one-off data 21 from the network device 120 to the NMS 110. The STREAM subscription 532b corresponds to a long-lived subscription that streams data 21 upon the occurrence of triggers specified by the STREAM subscription 532b. The POLL subscription 532c uses a stream to periodically request a set of data 21 from the network device 120.

FIG. 5A shows the NMS 110 transmitting a SubscribeRequest 520 to request updates from the network device 120 for a specified set of paths. The SubscribeRequest 520 may include a Subscribe field 522, a Poll field 524, and an Aliases field 526. The Aliases field 526 allows the NMS 110 to create an alias for the network device 120 to use for a specified path. The Aliases field 526 may include an AliasList message specifying a list of aliases represented by a target path (encoded path) for each alias, and the alias defined by the NMS 110 for the corresponding path. In scenarios when the network device 120 is unable to support the alias defined by the NMS 110, the network device 120 may return a SubscribeResponse 540 having the error field 546 set to one of an InvalidArgument error code when the specified alias is not acceptable to the network device, an AlreadyExists error code when the alias is a duplicate of an existing alias, a ResourceExhausted error code when the network device 120 has insufficient memory or processing resources to support the alias, or an Unknown error code in all other scenarios.

The Subscribe field 522 includes a SubscriptionList message 530 having a Subscription field 531, a Mode field 532, a Prefix field 533, a Use_aliases field 534, a qos field 535, an Allow_aggregation field 536, and a Use_models field 537. Only the Subscription field 531 may be required by the NMS 110 in the SubscriptionList message 530. The remaining fields 532-537 may be optional.

The Subscription field 531 in the SubscriptionList message 530 includes a set of Subscription messages indicating the new set of paths the NMS 110 is subscribing to on the network device 120. A Subscription message generically describes a set of data 21 that is to be subscribed to by the NMS 110, and includes a corresponding path. There is no requirement that the path specified by a Subscription message currently exist within the data tree on the network device 120, and therefore, the network device 120 will not close the channel with the NMS 110, and instead continue to monitor for the existence of the path at some time in the future. In some examples, the network device 120 transmits a SubscribeResponse 540 that populates an error field 546 (FIG. 5B) set to "NotFound" to inform the NMS 110 that the path does not exist at the time of subscription creation. For the STREAM and POLL subscriptions 532b, 532c, respectively, the NMS 110 may optionally specify additional parameters within the Subscription message.

The Mode field 532 provides the type of subscription including one of the ONCE subscription 532a, the STREAM subscription 532b, or the POLL Subscription 532c. In some examples, the default value for the Mode field 532 is the STREAM subscription 532b. The NMS 110 may create the ONCE subscription 532a by setting the Mode field 532 to the ONCE subscription 532a. A ONCE subscription 532a acts as a single request/response channel. For instance, the network device 120 may create and transmit a relevant SubscribeResponse 540 and close the channel after the SubscribeResponse 540 is transmitted.

In some implementations, the NMS 110 creates the STREAM subscription 532b by transmitting the SubscribeRequest 520 to the network device 120 with the Mode field 532 set to the STREAM subscription 532b (shown in FIG. 5A). Each entry within the Subscription message of the Subscription field 531 may be specified with one of an On Change mode or a Sampled mode. A STREAM subscription 532b specified with the "On Change" mode only sends data updates when the value of the data 21 changes. A heartbeat interval may be specified along with an "On Change" STREAM subscription 532b. Here, the value of the data item(s) is re-sent once per heartbeat interval regardless of whether the value has changed or not. On the other hand, a STREAM subscription 532b specified with the "Sampled" mode includes sample interval encoded as an unsigned 64-bit integer representing nanoseconds. The network device 120 may send the value of the data item(s) once per sample interval to the NMS 110. When the network device 120 is unable to support the sample interval, the network device rejects the STREAM subscription by returning the SubscribeResponse 540 with the error field 546 set an error message indicating the InvalidArgument error code. In examples when the sample interval is set to zero, the network device 120 must create the subscription and transmit the data 21 via telemetry using the lowest possible interval.

In some examples, the Subscription message of the Subscription field 531 for the STREAM subscription 532b optionally includes a suppress_redundant flag that when set to true, the network device 120 will not generate any telemetry updates unless the value of the path reported on changes since the last update. Generally, updates must only be generated for individual leaf nodes in the subscription that have changed. For instance, a subscription to/a/b—where there are leaves c and d branching from the b node, an update for c must be generated and an update for d must not be generated if the value of c has changed, but d remains unchanged. Additionally or alternatively, a heartbeat_interval may be specified to modify the behavior of the suppress-redundant field in a sampled STREAM subscription 532b. Here, the network device 120 generates one telemetry update per heartbeat interval regardless of whether the suppress_redundant flag is set to true. The heartbeat interval may include a value specified as an unsigned 64-bit integer in nanoseconds.

In some implementations, the NMS 110 creates a subscription specifying a target defined mode that allows the network device 120 to select the best type of subscription to be created on a per-data element basis. For instance, if the path specified within the Subscription message refers to some leaves which are event driven (e.g., the state of the network device changes based upon an external trigger), than the network device 120 may create the "On Change" STREAM subscription 532b. On the other hand, data associated with counter values may cause the network device 120 to create the Sampled STREAM subscription 532b.

In some implementations, the NMS 110 creates the POLL subscription 532c for on-demand retrieval of statistics via long-lived channels. The POLL subscription 532c specifies a set of subscribed paths and is initiated by transmitting the SubscribeRequest 520 to the network device 120 such that the Subscription messages of contained within the Subscription field 531 of the SubscriptionList 530 indicate the set of paths that are of interest to the NMS 110. In some examples, the NMS 110 transmits the SubscribeRequest 520 with the Poll field 524 containing an empty Poll message. In these examples, the network device generates updates for all the corresponding paths within the SubscriptionList 530 upon reception of the SubscribeRequest 520.

The Prefix field 533 provides a common prefix that is applied to all paths specified within the SubscriptionList message 530, and may include a default prefix equal to null. The Use_aliases field 534 may provide a Boolean flag that indicates whether the NMS 110 is accepting aliases associated with the network device 120 via a subscription channel. When the Boolean flag is set to true, the network device 120 may create aliases for paths within the subscription. Any aliases defined by the network device must be created separately from an update to the corresponding data item(s).

The qos field 535 corresponds to a packet marking utilized for the creation of the SubscribeResponse 540. The qos field 535 may include a single sub-value marking (e.g., packet header) which indicates a Differentiated Services Code Point (DSCP) value as a 32-bit unsigned integer. In scenarios when the qos field 535 is not specified, the network device 120 may stream telemetry data using a default DSCP marking for management-plane traffic.

The Allow_aggregation field 536 of the SubscriptionList message 530 may provide a Boolean value for use by the NMS 110 to allow schema elements marked eligible as aggregation capable for combining into single telemetry update messages (e.g., SubscribeResponse 540 RPCs). In some examples, aggregation is not used by default. Where aggregation is permitted by both the NMS 110 and the specified data schema, each update message may contain a key value pair, where the key must be the path to the element within the data tree which is explicitly marked as being eligible for aggregation by the data schema defining it. In some examples, the value must be an object which encodes the children of the data tree element specified. For JSON, the value is therefore a JSON object, and for Protobuf is a series of binary-encoded Protobuf The Use_models field 537 provides a model data message specifying the data schema(s) for use by the network device 120 when creating a subscription. In some examples, when the Use_model field 537 specifies a specific data schema, the network device 120 must only consider data elements within the specified data schema. Otherwise, the network device 120 may consider all data elements defined by every data schema supported by the network device 120. The NMS 110 may obtain the data schemas supported by the network device 120 from the Supported Models field 242 (FIG. 2B) within the CapabilityResponse 240 (FIG. 2B) returned from the network device 120. As set forth above, the model data message may contain the name field associated with the name of the model expressed as a string, the organization filed associated with the organization publishing the model expressed as a string, and the version field associated with the supported version of the model expressed as a string.

The network device 120 creates messages based on the type of subscription specified in the received SubscribeRequest 520 and at the frequency requested by the NMS 110. The subscriptions correspond to a set of paths (i.e., defined in the Subscribe field 522 of the received SubscribeRequest 520) which cannot be modified throughout the lifetime of the subscription. In order to cancel a subscription, the NMS 110 must close the gRPC channel over which the SubscribeRequest 520 RPC was initiated, or terminate the entire gRPC session with the network device 120. Subscriptions are fundamentally a set of independent update messages included in SubscribeResponse 540 RPCs that relate to the state of the data tree. In other words, it is not possible for the NMS 110 requesting a subscription to assume that the set of update messages received with in the SubscribeResponse 540 RPCs represent a snapshot of the data tree at a particular point in time. Subscriptions therefore allow the NMS 110 to (1) receive ongoing updates (i.e., the STREAM subscription 532b) from the network device 120 to allow synchronization between the NMS 110 and the network device 120 for the state of elements within the data tree, and (2) receive a single view (i.e., the ONCE subscription 532a or the POLL subscription 532c) for elements of the data tree on a per-data element basis according to the state of the elements at the time the SubscribeRequest 520 is transmitted. In the case of the STREAM subscription 532b, the NMS 110 receives an initial set of updates, receives a message indicating that initial synchronization is complete, and receives subsequent updates indicating changes to the initial state of those elements. In the case of the single view subscriptions (e.g., the ONCE subscription 532a or the POLL subscription 532c), the network device 120 does not have to coalesce values into a single snapshot view as with the GetResponse 340, or create an additional in-memory representation of the subtree at the time request and subsequently transmit the entire view to the NMS 110.

Referring to FIG. 5B, the SubscribeResponse 540 returned from the network device 120 to the NMS 110 over the channel established by the corresponding SubscribeRequest 520 includes a set of response fields that includes an Update field 542, a Sync Response field 544, and the Error field 546. The Update field 542 includes notification messages that provide an update value for a specified path and a timestamp 350 field indicating a time at which the network device 120 collected the value of the path being updated. In some implementations, when a leaf node's value has changed, or a new node has been created, an update message specifying the path and value for the updated data item must be appended to Update field 542 of the SubscribeResponse 540. In some examples, when a node within the subscribed paths has been removed, a delete field of the notification message must have the path of the removed node appended to the Update field 542. Moreover, the notification message of the Update field 542 may specify an aliased defined by the network device 120 and include an aliased path within a prefix field, and an on-null alias field.

In some implementations, the SubscribeResponse 540 having the Sync Response field 544 set to true must transmit to the NMS 110 to indicate that the initial transmission of an initial update has concluded when the network device 120 completes transmission of the initial updates for all paths specified within the SubscriptionList 530 of the SubscribeRequest 520. In doing so, the NMS 110 is informed that all existing data for the subscription has been transmitted by the network device 120 at least once. In some examples, following the transmission of all updates corresponding to the data items within the set paths specified within the SubscriptionList 530 of the SubscribeRequest 520, the channel over which the corresponding SubscribeRequest was received must be closed.

Figure 6:
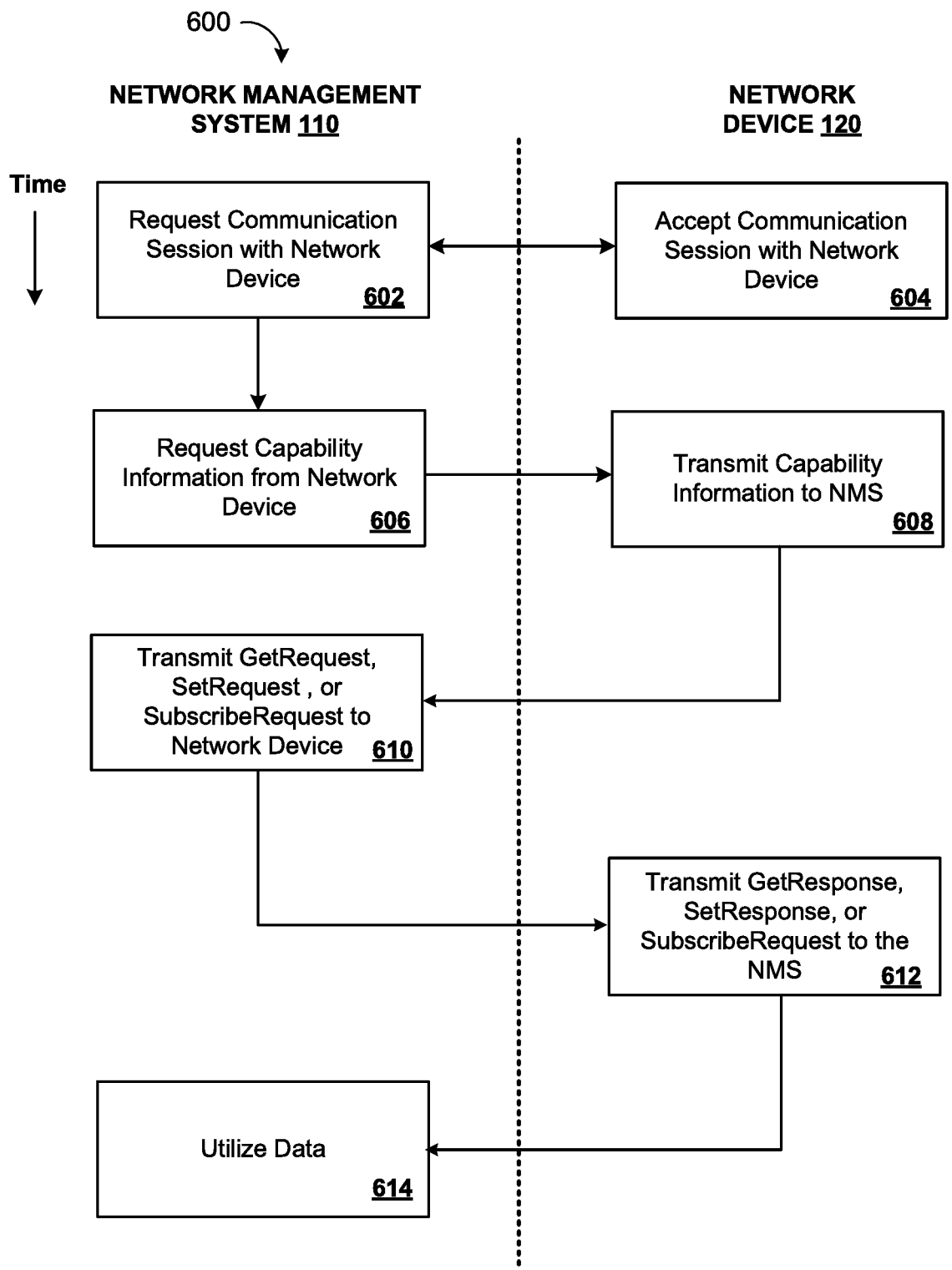
FIG. 6 is a schematic view of a diagram of example operations performed by a network management system and a network device when the network management system requests a communication with the network device over a specified protocol.

FIG. 6 is a diagram 600 illustrating example operations performed by the NMS 110 and the network device 120 when the NMS 110 requests a communication session with the network device 120. At operation 602, the NMS 110 transmits a request 22 for the communication session with the network device 120, and at operation 604, the network device 120 accepts the communication session and provides a response 24 informing the NMS 110 that the communication session is accepted. A specified protocol (e.g., gRPC-based protocol) allows for bi-directional telemetry communications 20 between the NMS 110 and the network device 120 for the communication session. In some examples, the communication session is mutually authenticated. At operation 606, the NMS 110 may transmit the CapabilityRequest 220 to the network device 120 to request capability information 230 therefrom. At operation 608, the network device 120 transmits the CapabilityResponse 240 to the NMS 110. The CapabilityResponse 240 includes the requested capability information 230. The capability information 230 may include the supported models field 242, the supported encodings field 244, and the version field 246 of FIG. 2B.

In some implementations, the NMS 110 uses the capability information 230 returned from the network device 120 when transmitting subsequent requests 22 to the network device 120. For instance, at operation 610, the NMS 110 transmits a request 22 to the network device 120 that includes one of the GetRequest 320, the SetRequest 420, or the SubscribeRequest 520. Any of the requests 320, 420, 520 received by the network device 120 at operation 612 may specify one or more data schemas and/or encodings supported by the network device 120 for use when returning the corresponding GetResponse 340, SetResponse 440, or SubscribeResponse 540. In some examples, the NMS 110 discovers the encodings and/or data schemas supported by the network device 120 from the corresponding supported models field 242 and/or the corresponding supported encodings field 244 within the capability information 230 of the CapabilityResponse 240.

The GetRequest 320 specifies a set of paths identifying data 21 on the network device 120 and may optionally specify one or more types of the data 21. The types may include one or more of configuration information 342, state information 344, or operational information 346. If the GetRequest 320 does not specify the one or more types of the requested data 21, the network device 120 may retrieve each one of the configuration information 342, the state information 344, and the operational information 346 existing on the network device 120 when the GetRequest 320 is received.

The SetRequest 420 specifies one or more operations 442 for the network device 120 to process. The operations 442 may include a delete operation specified in a Delete field 422 of the SetRequest 420, a replace operation specified in a Replace field 424 of the SetRequest 420, and/or an update operation specified in an Update field 426 of the SetRequest 420.

The SubscribeRequest 520 is configured to allow the NMS 110 to subscribe to updates for requested data 21 existing on the network device 120. The SubscribeRequest 520 may specify a set of paths (e.g., within the Subscription field 531 of the SubscriptionList Message 530) identifying the requested data 21 and a subscription mode 532 that indicates triggers for the network device to return the updates for the requested data 21 to the NMS 110. The subscription mode 532 may be set to one of a ONCE subscription 532a, a STREAM subscription 532b, or a POLL subscription 532c.

At operation 612, the network device 120 transmits the corresponding GetResponse 340, SetResponse 440, or SubscribeResponse 540. The GetResponse 340 includes a corresponding notification message for each path specified by the GetRequest 320 previously received. Referring to FIG. 3, each notification message may include a snapshot of the requested data 21 for the corresponding path and a timestamp TS 350 indicating a time at which the network device 120 took the snapshot of the requested data 21 for the corresponding path. At operation 612, the NMS 110 utilizes the data 21 provided in the corresponding GetResponse 340, SetResponse 440, or SubscribeResponse 540.

The SetResponse 440 includes a message field 444, indicating whether or not an entire transaction associated with the SetRequest 420 was successful, and an UpdateResult response 446a-n for each operation 442 specified by the SetRequest 420. If the network device 120 is unable to process any one of the operations 442, the entire transaction fails and the message field 444 includes an error message informing the NMS 110 of the failed transaction. Each UpdateResult response 446a-n indicates a value for the corresponding processed operation (e.g., set equal to one of Delete, Replace, or Update) and an element of the requested data 21 modified by the corresponding processed operation 442. For operation 442 that the network device 120 is unable to process, the corresponding UpdateResult response 446a-n may provide an error message within an Error field 454 to inform the NMS 110 that the network device 120 is unable to process the corresponding operation 442.

The SubscribeResponse 540 includes an Update field 542 having one or more notification messages each providing an update value for a corresponding path specified by the SubscribeRequest 520. For the ONCE subscription 532a or the POLL subscription 532c, the network device 120 may retrieve the requested data 21 on a per-data element basis at a transmission time of the SubscribeRequest 520 and thereafter encapsulate the retrieved data 21 into the SubscribeResponse 540 for transmission to the NMS 110. For the STREAM subscription 532b specified in the On Change mode, the network device 120 transmits the SubscribeResponse 540 each time the updated value for the corresponding path specified by the SubscribeRequest 520 updates. For the STREAM subscription 532b specified in the Sampled mode, the network device 120 transmits the SubscribeResponse 540 during a sample interval specified by the STREAM subscription 532b.

Figure 7:
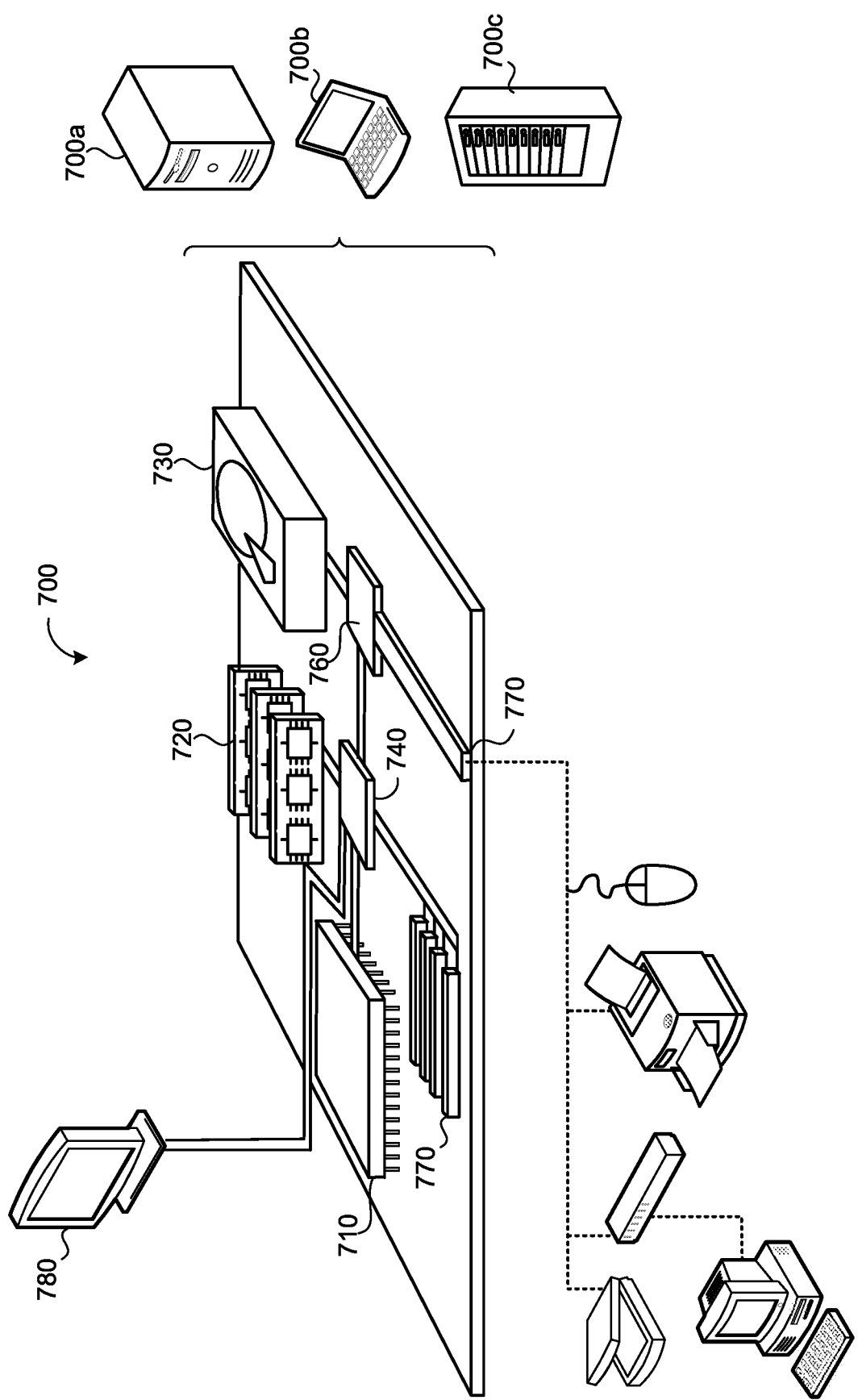
FIG. 7 is a schematic view of an example computing device.

FIG. 7 is schematic view of an example computing device 700 (e.g. data processing hardware) that may be used to implement the systems and methods described in this document. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document. The network device 120 may implement the computing device 700. Additionally or alternatively, the network management system 110 may implement the computing device 700.

The computing device 700 includes a processor 710 (e.g., data processing hardware), memory 720, a storage device 730, a high-speed interface/controller 740 connecting to the memory 720 and high-speed expansion ports 750, and a low speed interface/controller 760 connecting to low speed bus 770 and storage device 730. Each of the components 710, 720, 730, 740, 750, and 760, are interconnected using various busses, and may be mounted on a common motherboard or in other manners as appropriate. The processor 710 can process instructions for execution within the computing device 700, including instructions stored in the memory 720 or on the storage device 730 to display graphical information for a graphical user interface (GUI) on an external input/output device, such as display 780 coupled to high speed interface 740. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 720 stores information non-transitorily within the computing device 700. The memory 720 may be a computer-readable medium, a volatile memory unit(s), or non-volatile memory unit(s). The non-transitory memory 720 may be physical devices used to store programs (e.g., sequences of instructions) or data (e.g., program state information) on a temporary or permanent basis for use by the computing device 700. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 730 is capable of providing mass storage for the computing device 700. In some implementations, the storage device 730 is a computer-readable medium. In various different implementations, the storage device 730 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 720, the storage device 730, or memory on processor 710.

The high speed controller 740 manages bandwidth-intensive operations for the computing device 700, while the low speed controller 760 manages lower bandwidth-intensive operations. Such allocation of duties is exemplary only. In some implementations, the high-speed controller 740 is coupled to the memory 720, the display 780 (e.g., through a graphics processor or accelerator), and to the high-speed expansion ports 750, which may accept various expansion cards (not shown). In some implementations, the low-speed controller 760 is coupled to the storage device 730 and low-speed expansion port 770. The low-speed expansion port 770, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 700a or multiple times in a group of such servers 700a, as a laptop computer 700b, or as part of a rack server system 700c.

Figure 8:
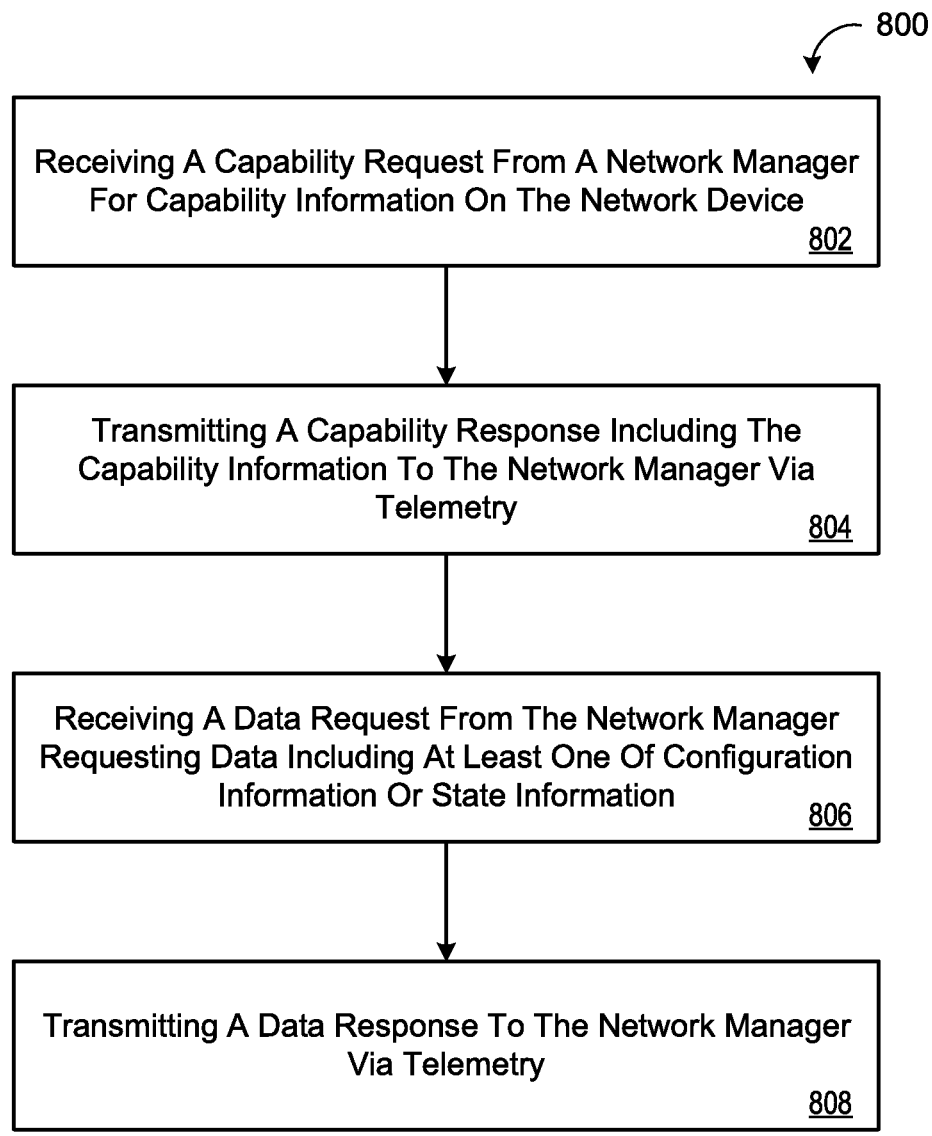
FIG. 8 is a flowchart of an example method for communicating between a network management system and a network element.

FIG. 8 illustrates an example arrangement of operations for a method 800 for communicating between a network management system (NMS) 110 and a network device 120 over specified protocol enabling bi-directional streaming therebetween. The flowchart starts at operation 802 when data processing hardware 700 of the network device 120 receives a CapabilityRequest 220 from the NMS 110 for capability information 230 on the network device 120. At operation 804, the data processing hardware 700 transmits a CapabilityResponse 240 including the capability information 230 to the NMS 110 via telemetry. The capability information 230 may include one or more data schemas supported by the network device 120.

At operation 806, the data processing hardware 700 receives a data request 320, 520 from the NMS 110 requesting data 21 including at least one of configuration information 342 or state information 344. The data request 320, 520 specifies at least one of the data schemas supported by the network device 120 for use by the network device 120 when returning the requested data 21 to the NMS 110.

At operation 808, the data processing hardware 700 transmits a data response 340, 540 to the NMS 110 via telemetry. The data response 340, 540 includes the requested data 21 having data elements defined by the specified at least one data schema. The capability and data requests 220, 320, 520 and the capability and data responses 240, 340, 540 adhere to the specified protocol/

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:
1. A method comprising:
receiving, at data processing hardware of a network device, a capability request from a network manager for capability information on the network device;

transmitting, from the data processing hardware of the network device to the network manager via telemetry, a capability response comprising the capability information, the capability information comprising data schemas supported by the network device, encodings supported by the network device, and a version of a network management interface service supported by the network device;

receiving, at the data processing hardware of the network device, a request from the network manager requesting data comprising at least one of state information or configuration information, the request specifying one or more of (i) the data schemas and/or (ii) the encodings supported by the network device for use by the network device when returning the requested data to the network manager, the request comprising:
- a get request to obtain a snapshot of the requested data existing on the network device; or
- a subscribe request to subscribe to updates for the requested data existing on the network device;

transmitting a data response from the data processing hardware to the network manager via telemetry, the data response comprising the requested data having data elements defined by the specified one or more of (i) the data schemas and/or (ii) the encodings supported by the network device;

receiving, at the data processing hardware of the network device, a set request from the network manager, the set request specifying a set of two or more operations for the network device to process, each operation in the set of two or more operations specified by the set request comprising any one of a delete operation, a replace operation, or an update operation; and transmitting a set response from the data processing hardware to the network manager via telemetry, the set response indicating whether or not the network device successfully processed all of the operations in the set of two or more operations specified by the set request, wherein the data and set requests and the data and set responses adhere to a protocol configured to enable bi-directional streaming between the network manager and the network device.

2. The method of claim 1, wherein the get request specifies a set of paths identifying the requested data within one or more schema definition models restricted by at least one of the data schemas supported by the network device for use by the network device when returning the requested data to the network manager.

3. The method of claim 2, wherein the get request specifies at least one of the encodings supported by the network device for use by the network device when serializing the set of paths.

4. The method of claim 2, wherein transmitting the data response comprises transmitting a get response comprising a corresponding notification message for each path specified by the get request, each notification message comprising the snapshot of the requested data for the corresponding path and a timestamp field indicating a time at which the network device took the snapshot of the requested data for the corresponding path.

5. The method of claim 1, wherein the subscribe request specifies a set of paths identifying the requested data within one or more schema definition models restricted by at least one of the data schemas supported by the network device and a subscription mode that indicates triggers for the network device to return the updates for the requested data to the network manager.

6. The method of claim 5, wherein transmitting the data response comprises transmitting a subscribe response comprising an update field including one or more notification messages each providing an update value for a corresponding path specified by the subscribe request.

7. The method of claim 6, further comprising, when the subscription mode specified by the subscribe request comprises a periodically-polled subscription:
- retrieving, by the data processing hardware of the network device, the requested data on a per-data element basis from memory hardware in communication with the data processing hardware at a transmission time of the subscribe request; and
- encapsulating, by the data processing hardware of the network device, the requested data into the subscribe response.

8. The method of claim 6, further comprising, when the subscription mode specified by the subscribe request comprises a one-off subscription:
- retrieving, by the data processing hardware of the network device, the requested data on a per-data element basis for each corresponding path specified by the subscribe request without requiring serialization of the paths specified by the subscribe request simultaneously; and
- encapsulating, by the data processing hardware of the network device, the requested data into the subscribe response via multiple notification messages.

9. The method of claim 6, wherein transmitting the subscribe response comprises, when the subscription mode specified by the subscribe request comprises a Stream subscription:
- transmitting the subscribe response each time the update value for the corresponding path specified by the subscribe request changes; or
- transmitting the subscribe response during a sample interval specified by the Stream subscription, wherein the subscribe response includes a timestamp indicating a time at which the requested data was sampled.

10. The method of claim 1, further comprising, in response to receiving the set request from the network manager:
- determining, by the data processing hardware of the network device, whether the network device is able to process each operation in the set of two or more operations specified by the network manager in the set request; and
- when the network device is able to process each operation in the set of two or more operations specified by the network manager in the set request:
  - processing, by the data processing hardware of the network device, the operations; and
  - transmitting the set response from the data processing hardware to the network manager, the set response comprising a corresponding update result response for each of the processed operations, the update result response indicating a value for the corresponding processed operation and path of an element of the requested data modified by the corresponding processed operation.

11. The method of claim 10, further comprising, when the network device is unable to process at least one of the operations in the set of two or more operations specified by the network manager, transmitting the set response from the data processing hardware to the network manager, the set response comprising a message field providing an error message indicating that the network device is unable process the set of two or more operations specified by the network manager in the set request.

12. The method of claim 1, further comprising, prior to transmitting the data response to the network manager:
   in response to receiving the data request, authenticating, by the data processing hardware of the network device, the network manager; and
   determining, by the data processing hardware of the network device, whether the network manager is authorized to access the network device for the requested data,
   wherein the network manager transmits the data response to the network manager when the network manager is authorized and authenticated.

13. A network system comprising:
   a network manager;
   a network device;
   data processing hardware in communication with the network device; and
   memory hardware in communication with the data processing hardware, the memory hardware storing instructions that when executing on the data processing hardware cause the data processing hardware to perform operations comprising:
      receiving a capability request from the network manager for capability information on the network device;
      transmitting a capability response comprising the capability information to the network manager via telemetry, the capability information comprising data schemas supported by the network device, encodings supported by the network device, and a version of a network management interface service supported by the network device;
      receiving a request from the network manager requesting data comprising at least one of state information, configuration information, or operational information, the request specifying one or more of the data schemas and/or the encodings supported by the network device for use by the network device when returning the requested data to the network manager, the request comprising:
         a get request to obtain a snapshot of the requested data existing on the network device; or
         a subscribe request to subscribe to updates for the requested data existing on the network device;
      transmitting a data response to the network manager via telemetry, the data response comprising the requested data having data elements defined by the specified one or more of (i) the data schemas and/or (ii) the encodings supported by the network device;
      receiving a set request from the network manager, the set request specifying a set of two or more operations for the network device to process, each operation in the set of two or more operations specified by the set request comprising any one of a delete operation, a replace operation, or an update operation; and
      transmitting a set response to the network manager via telemetry, the set response indicating whether or not the network device successfully processed all of the operations in the set of two or more operations specified by the set request,
      wherein the data and set requests and the data and set responses adhere to a protocol configured to enable bi-directional streaming between the network manager and the network device.

14. The system of claim 13, wherein the get request specifies a set of paths identifying the requested data within one or more schema definition models restricted by at least one of the data schemas supported by the network device for use by the network device when returning the requested data to the network manager.

15. The system of claim 14, wherein the get request specifies at least one of the encodings supported by the network device for use by the network device when serializing the set of paths.

16. The system of claim 14, wherein transmitting the data response comprises transmitting a get response comprising a corresponding notification message for each path specified by the get request, each notification message comprising the snapshot of the requested data for the corresponding path and a timestamp field indicating a time at which the network device took the snapshot of the requested data for the corresponding path.

17. The system of claim 13, wherein the subscribe request specifies a set of paths identifying the requested data within one or more schema definition models restricted by at least one of the data schemas supported by the network device and a subscription mode that indicates triggers for the network device to return the updates for the requested data to the network manager.

18. The system of claim 17, wherein transmitting the data response comprises transmitting a subscribe response comprising an update field including one or more notification messages each providing an update value for a corresponding path specified by the subscribe request.

19. The system of claim 18, further the operations further comprise, when the subscription mode specified by the subscribe request comprises a periodically-polled subscription:
   retrieving the requested data on a per-data element basis from the memory hardware at a transmission time of the subscribe request; and
   encapsulating the requested data into the subscribe response.

20. The system of claim 18, wherein the operations further comprise, when the subscription mode specified by the subscribe request comprises a one-off subscription:
   retrieving the requested data on a per-data element basis for each corresponding path specified by the subscribe request without requiring serialization of the paths specified by the subscribe request simultaneously; and
   encapsulating the requested data into the subscribe response via multiple notification messages.

21. The system of claim 18, wherein transmitting the subscribe response comprises, when the subscription mode specified by the subscribe request comprises a Stream subscription:
   transmitting the subscribe response each time the update value for the corresponding path specified by the subscribe request changes; or
   transmitting the subscribe response during a sample interval specified by the Stream subscription, wherein the subscribe response includes a timestamp indicating a time at which the requested data was sampled.

22. The system of claim 13, wherein the operations further comprise, in response to receiving the set request from the network manager:
   determining whether the network device is able to process each operation in the set of two or more operations specified by the network manager in the set request; and when the network device is able to process each operation in the set of two or more operations specified by the network manager in the set request:
processing the operations; and
transmitting the set response to the network manager, the set response comprising a corresponding update result response for each of the processed operations, the update result response indicating a value for the corresponding processed operation and path of an element of the requested data modified by the corresponding processed operation.

23. The system of claim 22, wherein the operations further comprise, when the network device is unable to process at least one of the operations in the set of two or more operations specified by the network manager, transmitting the set response to the network manager, the set response comprising a message field providing an error message indicating that the network device is unable process the set of two or more operations specified by the network manager in the set request.

24. The system of claim 13, wherein the operations further comprise, prior to transmitting the data response to the network manager:
in response to receiving the data request, authenticating the network manager; and
determining whether the network manager is authorized to access the network device for the requested data,
wherein the network manager transmits the data response to the network manager when the network manager is authorized and authenticated.

* * * * *